(12) United States Patent
Furusho

(10) Patent No.: US 7,225,198 B2
(45) Date of Patent: May 29, 2007

(54) DATA COMPILING METHOD

(75) Inventor: Shinji Furusho, Yokohama (JP)

(73) Assignee: Turbo Data Laboratories, Inc., Kanagawa (JP)

( * ) Notice: Subject to any disclaimer, the term of this patent is extended or adjusted under 35 U.S.C. 154(b) by 437 days.

(21) Appl. No.: 10/343,316

(22) PCT Filed: Jul. 30, 2001

(86) PCT No.: PCT/JP01/06530

§ 371 (c)(1),
(2), (4) Date: Jan. 30, 2003

(87) PCT Pub. No.: WO02/10976

PCT Pub. Date: Feb. 7, 2002

(65) Prior Publication Data

US 2004/0044683 A1    Mar. 4, 2004

(30) Foreign Application Priority Data

Jul. 31, 2000   (JP) ............................. 2000-231029

(51) Int. Cl.
*G06F 17/30* (2006.01)
(52) U.S. Cl. ..................... 707/102; 707/100
(58) Field of Classification Search ................ 707/2–4, 707/7, 101, 102, 200
See application file for complete search history.

(56) References Cited

U.S. PATENT DOCUMENTS

| | | | | |
|---|---|---|---|---|
| 5,237,678 A | * | 8/1993 | Kuechler et al. | 707/5 |
| 5,428,774 A | * | 6/1995 | Takahashi et al. | 707/101 |
| 5,940,841 A | * | 8/1999 | Schmuck et al. | 707/205 |
| 6,865,567 B1 | * | 3/2005 | Oommen et al. | 707/2 |
| 6,871,201 B2 | * | 3/2005 | Yu et al. | 707/7 |

FOREIGN PATENT DOCUMENTS

| | | |
|---|---|---|
| JP | 60-247732 | 12/1985 |
| JP | 63-298626 | 12/1988 |

(Continued)

OTHER PUBLICATIONS

Unoki, M., Sybase IQ, "The Approach to the Data Warehouse by the original data structure", Denshi Joho Gakkai Gijutsu Kenkyu (A197-42), Dec. 2, 1997, vol. 97, No. 415, pp. 51 to 56.

*Primary Examiner*—Sam Rimell
(74) *Attorney, Agent, or Firm*—Griffen & Szipl, P.C.

(57) ABSTRACT

A data compiling method for conversion into the form of an information block containing a value list in which table format data expressed as an array of records including items and item values contained in the items are so arranged that the item values are arranged in a predetermined order without any redundancy, and a position designation array including position designation numbers designating the item values in the value list and related to the record numbers. Adjoining partial intermediate blocks (811-0, 811-1) which include an item value array having item values related to the record numbers, an order designation array (VLP) for designating the positions of the item values in the item value array, and a position designating array (PV) for designating elements in the order designation array are merged to create a new partial intermediate block (812-0), and the operation of merging the partial intermediate blocks is repeated till the blocks are merged into one.

21 Claims, 27 Drawing Sheets

FOREIGN PATENT DOCUMENTS

| | | |
|---|---|---|
| JP | 2000-339390 | 12/2000 |
| JP | 2001-43290 | 2/2001 |
| JP | 2001-043290 | 2/2001 |
| WO | WO 00/10103 | 2/2000 |
| WO | WO00/10103 | 2/2000 |
| WO | WO 00/73939 A1 | 12/2000 |
| WO | WO00/73939 A1 | 12/2000 |
| WO | WO01/09764 A1 | 2/2001 |
| WO | WO 01/09764 A1 | 2/2001 |

* cited by examiner

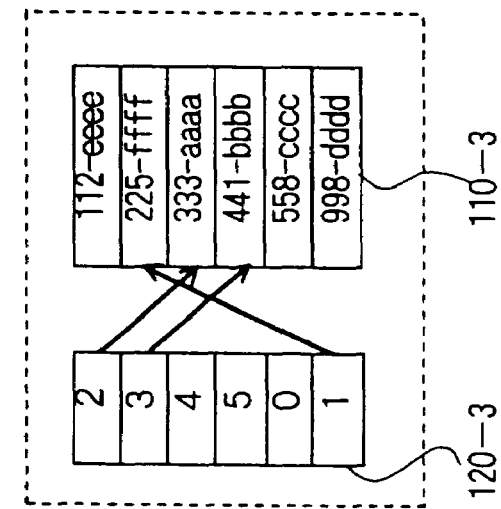
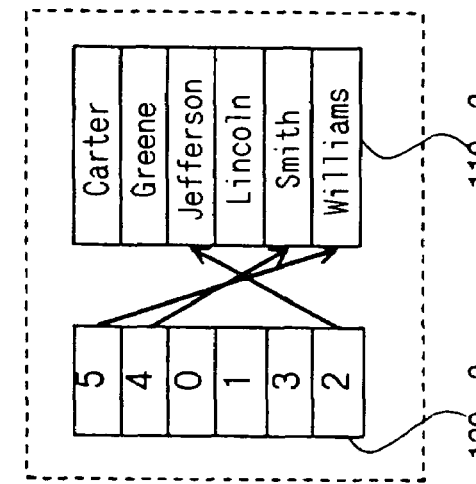
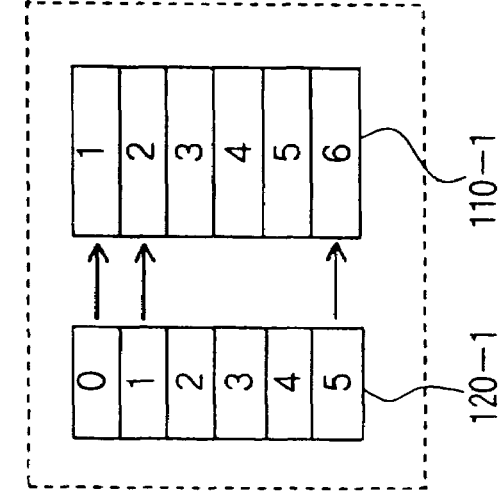

FIG. 4A
| RECORD NUMBERS | SEX | AGES | OCCUPATION |
|---|---|---|---|
| 0 | FEMALE | 1 8 | PROGRAMMER |
| 1 | MALE | 2 1 | STUDENT |
| 2 | FEMALE | 3 1 | TEACHER |
| ⋮ | ⋮ | ⋮ | ⋮ |
| 999999 | FEMALE | 1 6 | STUDENT |
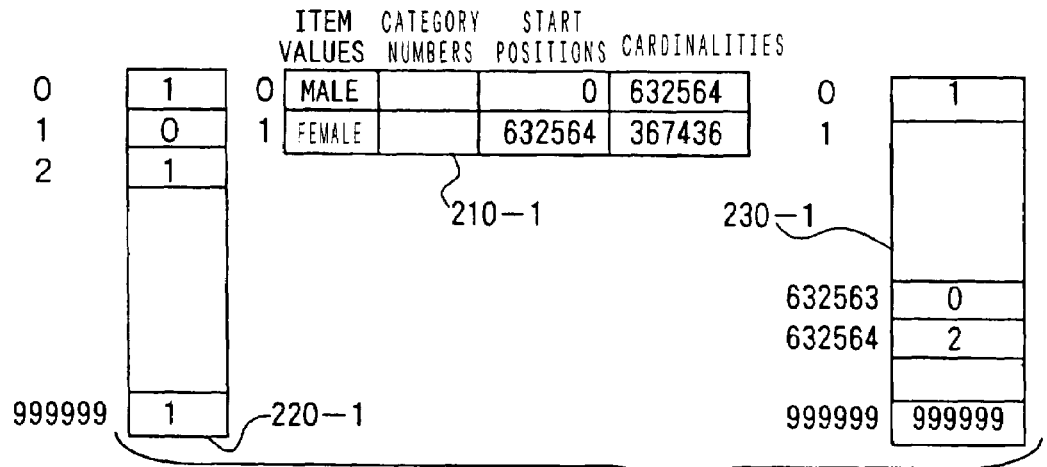
FIG. 4B
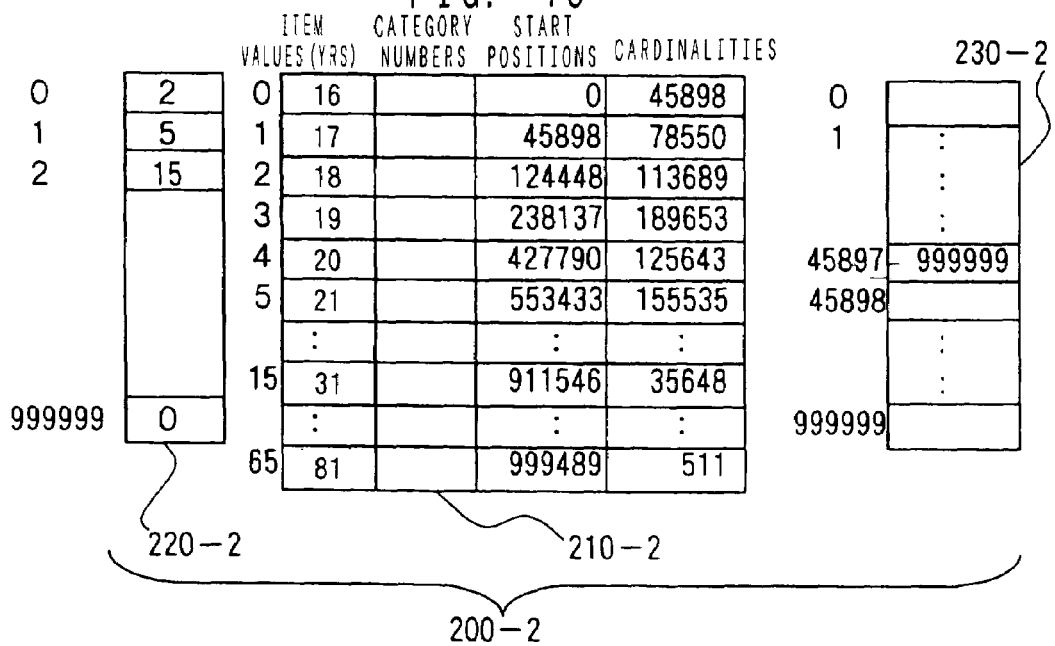
FIG. 4C

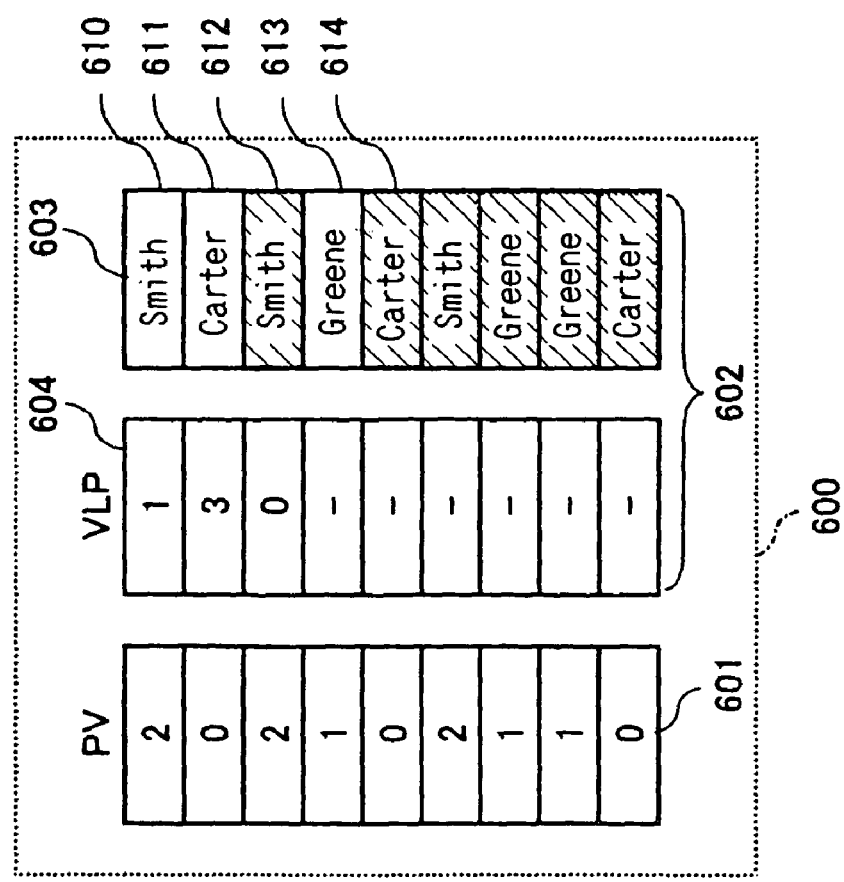

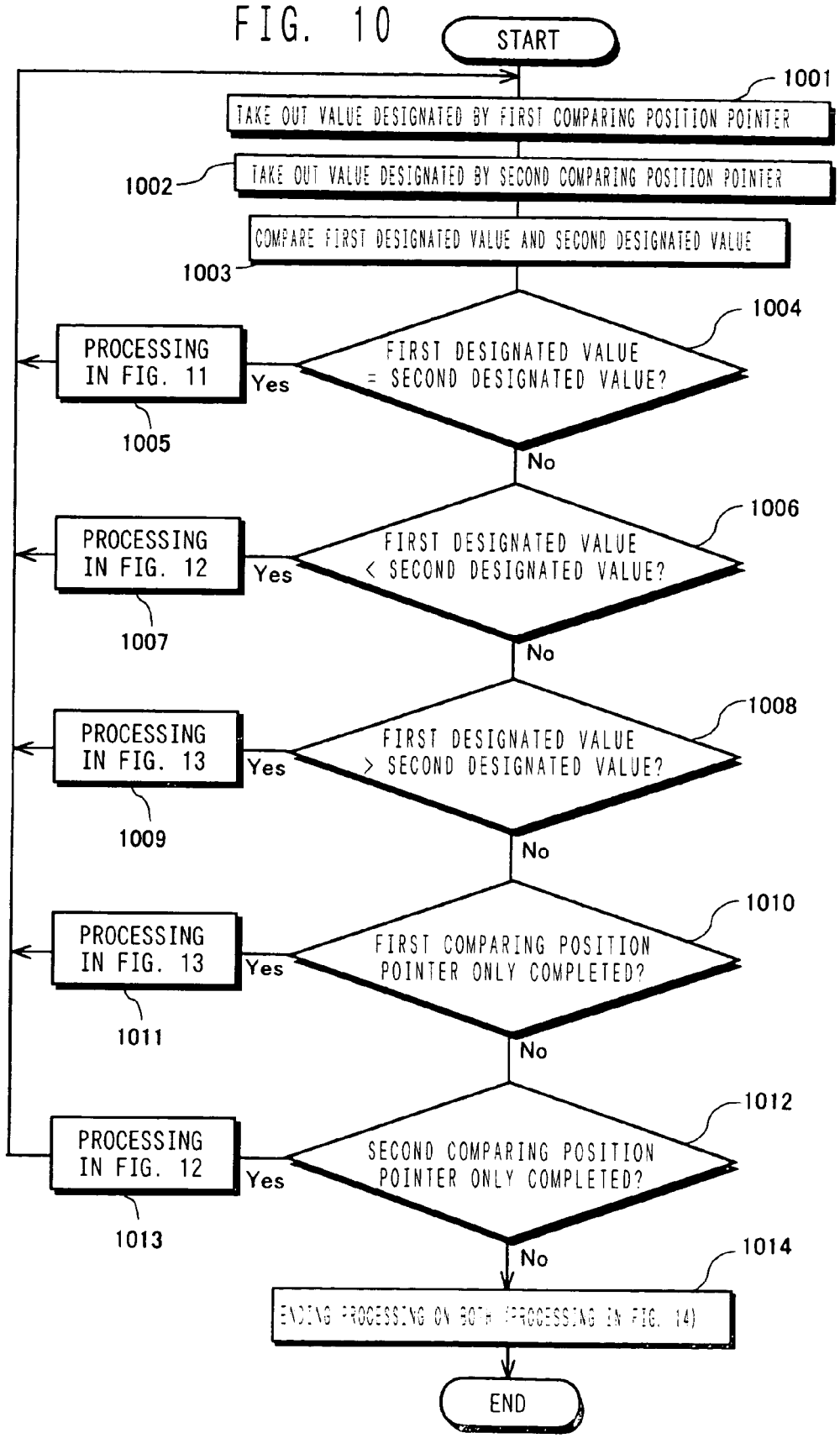

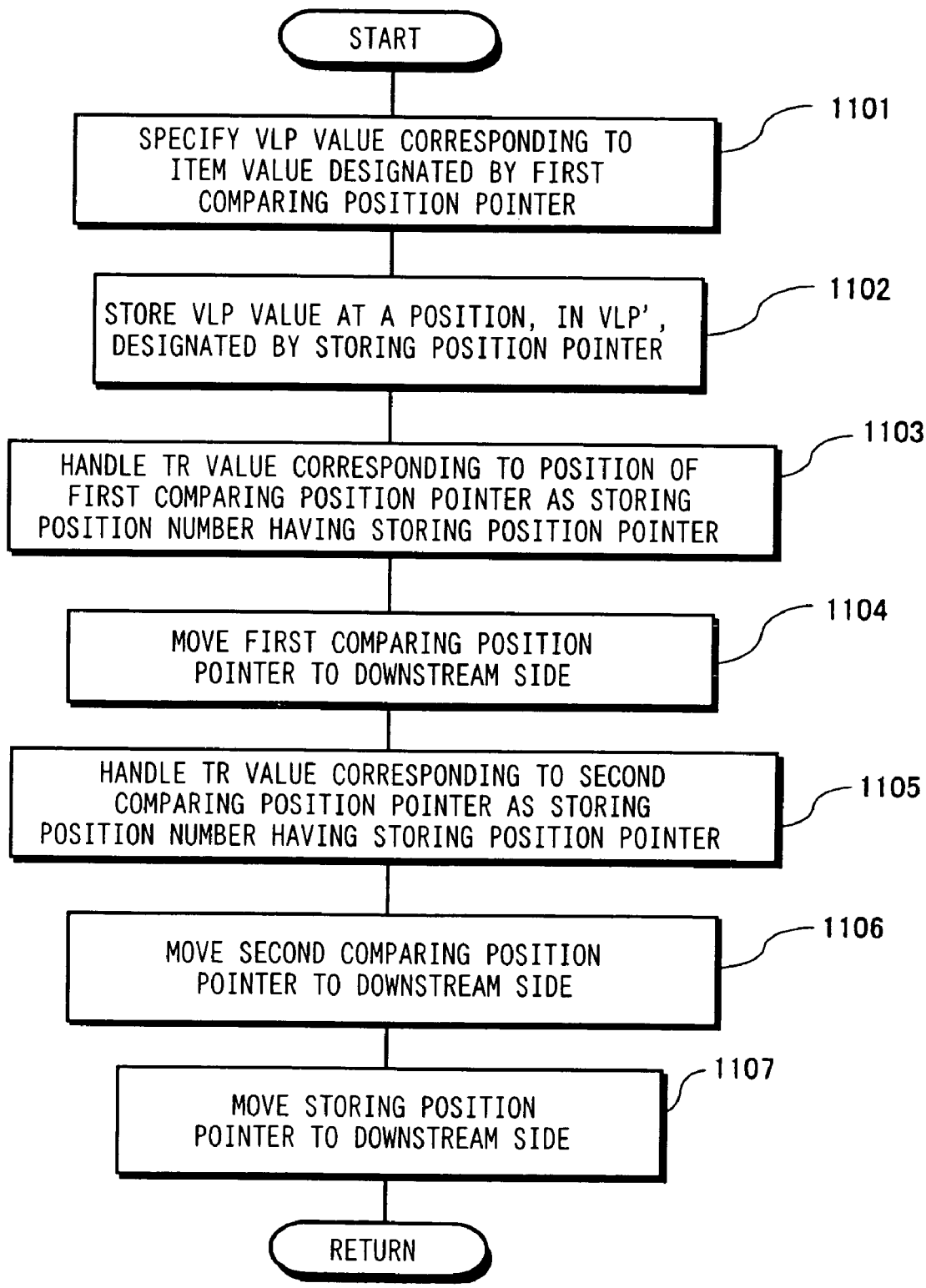

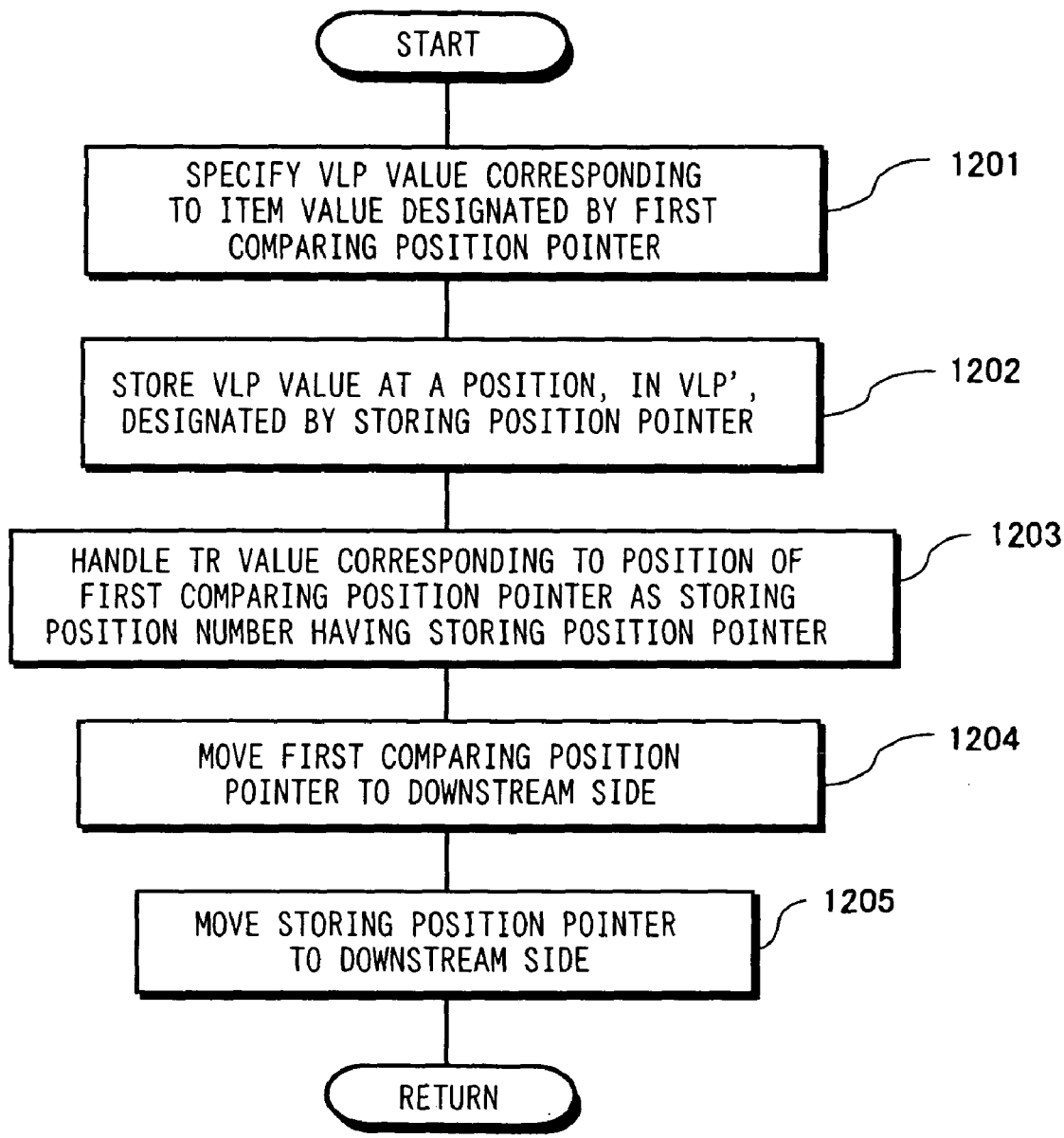

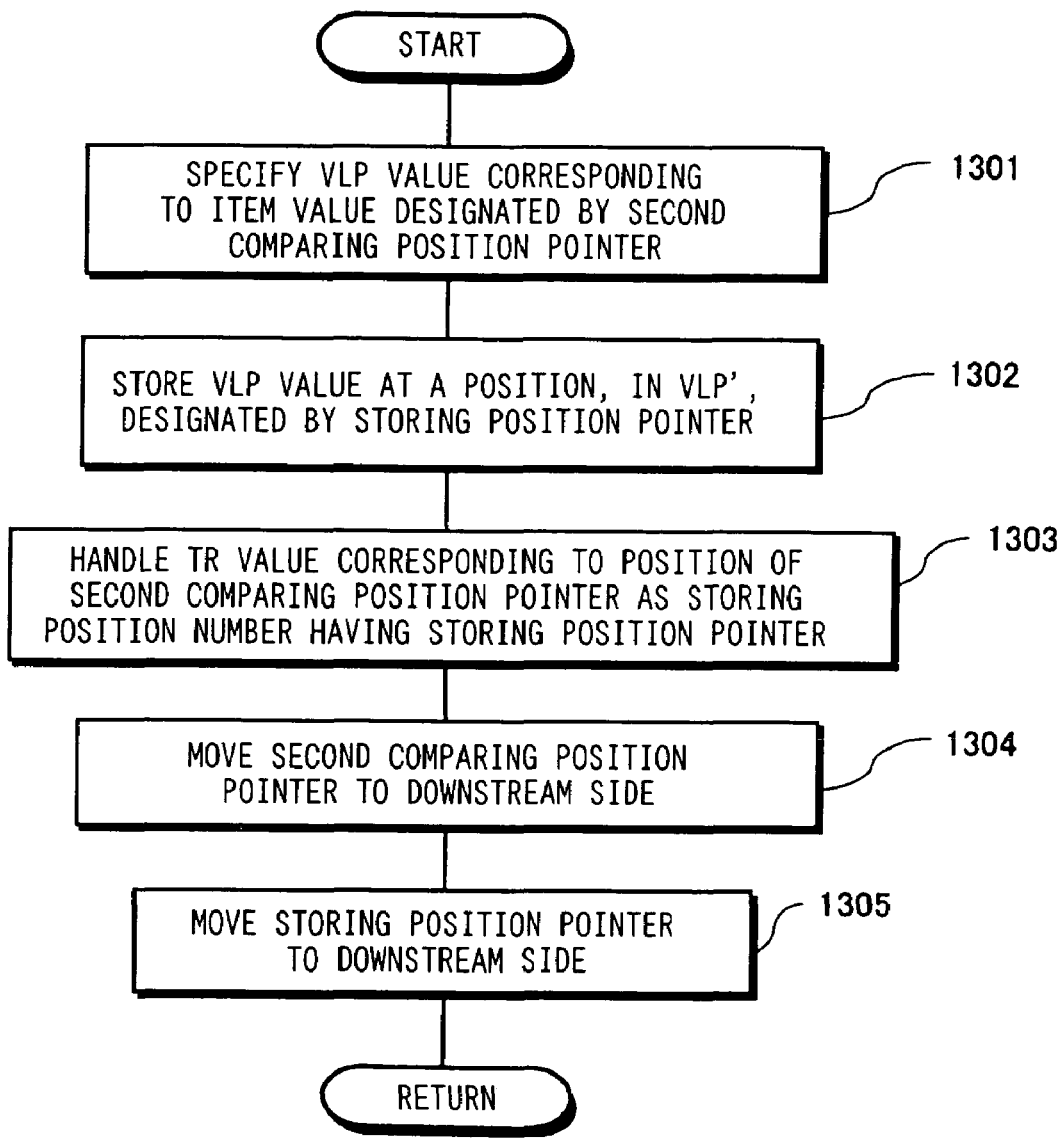

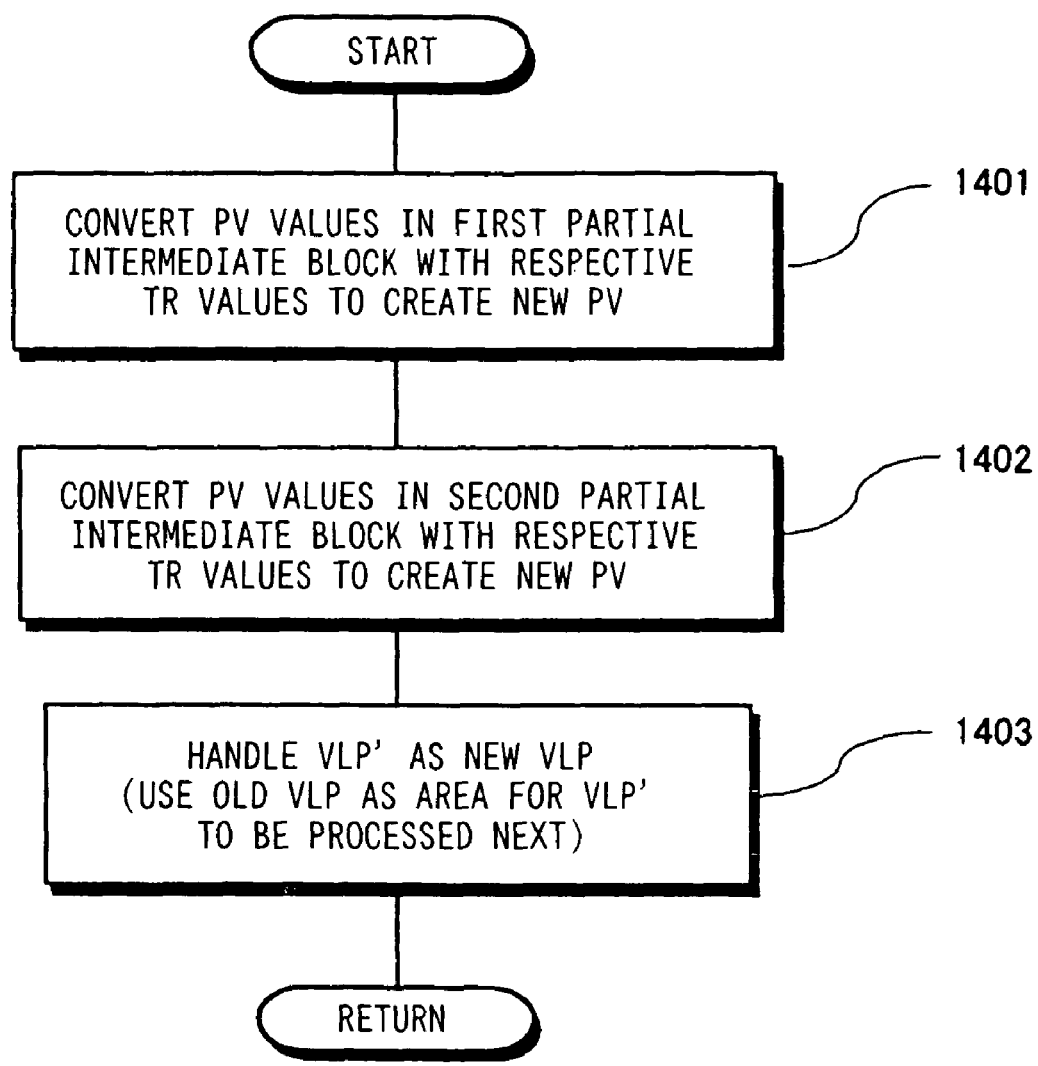

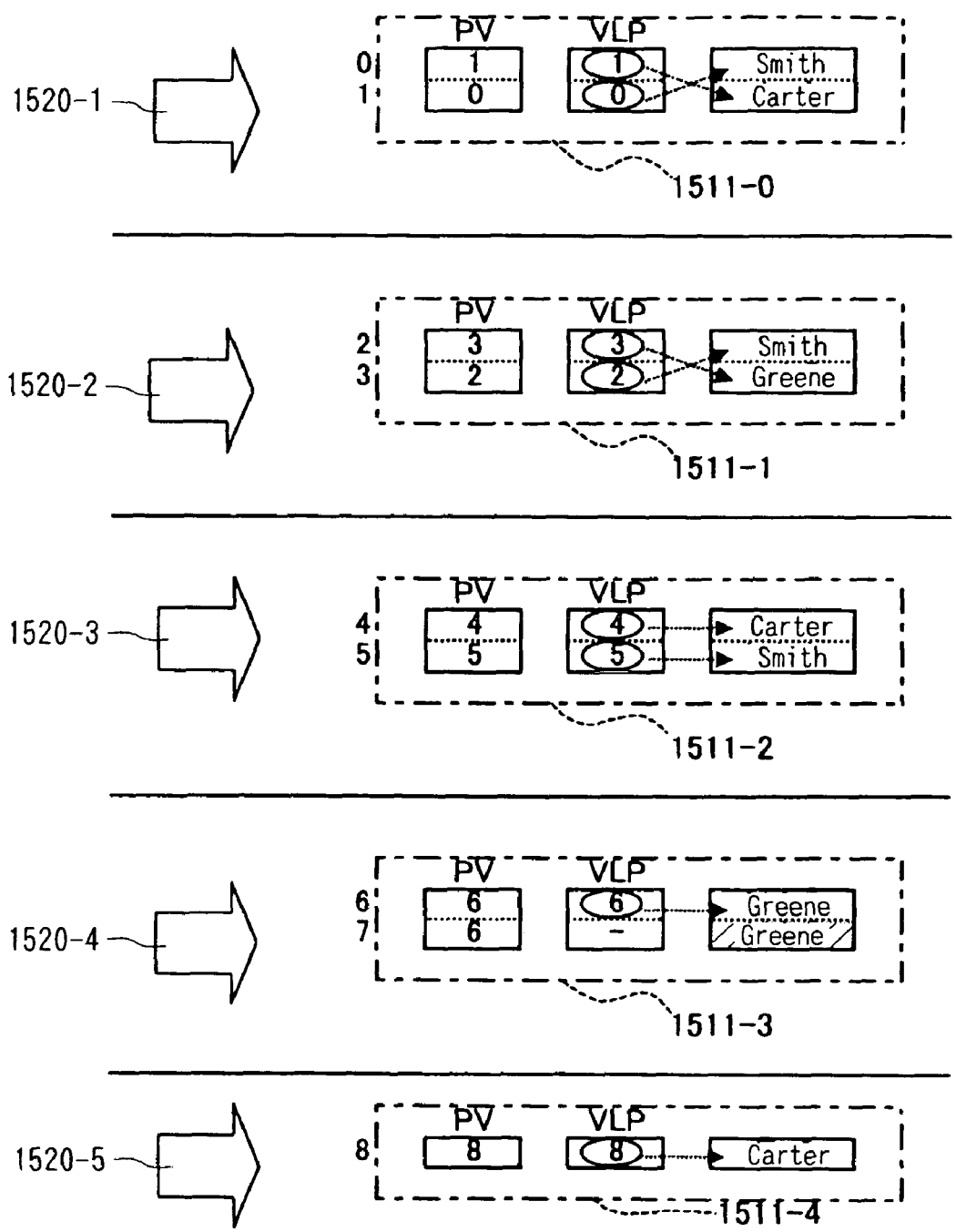

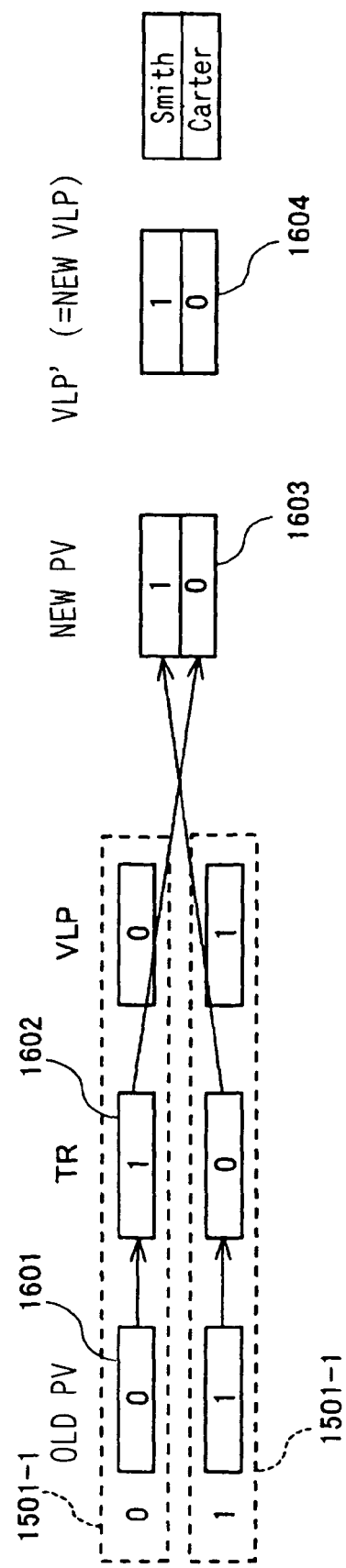

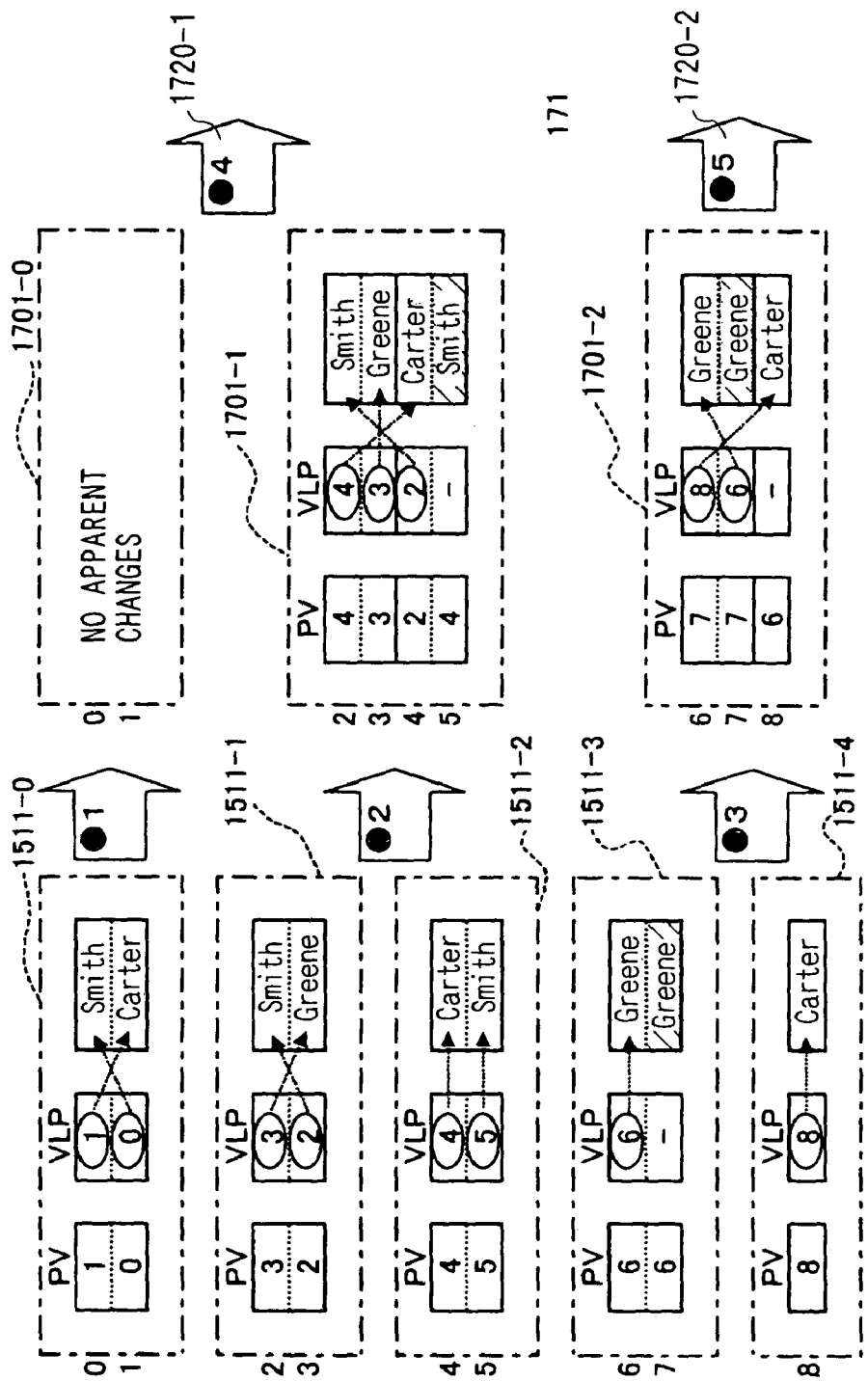

DATA COMPILING METHOD

This is a National Phase Application in the United States of International Patent Application No. PCT/JP01/06530 filed Jul. 30, 2001, which claims priority on Japanese Patent Application No. 2000-231029, filed Jul. 31, 2000.

TECHNICAL FIELD OF THE INVENTION

The present invention relates to a data processing method and data processing apparatus for processing a large amount of data by using an information processing apparatus such as a computer. More particularly, the present invention relates to a method and apparatus for converting data in an arbitrary table format to data in a predetermined format suitable for fast processing.

BACKGROUND ART

A large amount of time is required for retrieving, summarizing and sorting or for joining and updating a large amount of data such as a database. In order to solve this, the present inventor proposes a method for retrieving, summarizing and sorting data in a table format extremely fast and a method for joining and updating or for performing transaction processing on data in a table format (JP-A-10-227278 and JP-A-10-338133: PCT/JP99/04300, JP-A-11-151156: PCT/JP00/03465, and JP-A-11-215450: PCT/JP00/05135).

Innovatively, according to a series of these proposed methods, uniform processing can be performed by using no indices. In addition, processing can be performed on a subset by keeping the efficiency.

In order to achieve the fast retrieving, summarizing, sorting, joining and updating, data in a given table format must be converted to data in a predetermined format (this processing will be called "compiling" or "compile processing" hereinafter). In this form, as shown in FIG. 2, a value list and an array (pointer array) are provided. In the value list, item values of a given item are located without any redundancy in a predetermined order. The array includes elements corresponding to record numbers. Each of the elements designates a position in the value list including item values corresponding to the record numbers. A data group of a given item in a predetermined format is referred to as an information block.

The compile processing is required in following cases:
(1) where data in a newly given table format should be converted and be stored into data in a predetermined format;
(2) where a new item is calculated from one or multiple items; and
(3) where data in one table format should be added to data in the other table format, for example, where a table for February is added to a table for January.

In order to implement the compile processing in these cases, item values in a value list may be arranged in a different order by using a known sorting method (for example, quick sorting) conventionally.

However, when an information block is created by using the known sorting method, problems may occur as follows:
(1) In general, O ($n*\log(n)$) comparison computing is required, which needs a large amount of processing time;
(2) When quick sorting is used especially, the processing efficiency may be reduced extremely in some data distributions; and
(3) Fast sorting is difficult by using multiple processors.

It is an object of the present invention to provide a data compiling method, which allows faster processing time and which may not extremely reduce a processing efficiency in some data distributions.

The invention may be also effectively applied to a single processor. Especially, it is another object of the present invention to provide a data compiling method, which can dramatically improve performance in a massive parallel system.

DISCLOSURE OF INVENTION

The objects of the invention may be achieved by a data compiling method for converting table format data expressed as an array of records each including an item and an item value included therein into an information block form having a value list including item values in a predetermined order with no redundancy and a position designating array including position designating numbers for designating item values in the value list in accordance with record numbers, the method including the steps of:

creating, in the table format data, a partial intermediate block including an item value array including item values corresponding to record numbers, an order designating array for designating positions of item values in the item value array, and a position designating array for designating elements in the order designating array, the partial intermediate block initially corresponding to a single record;

selecting adjacent partial intermediate blocks and creating a pair of a first partial intermediate block and a second partial intermediate block;

merging item value arrays of the pair to create a new item value;

determining elements of the order designating array so as to specify item values in a predetermined order in a merged new item value array by comparing item values belonging to the first partial intermediate block and item values belonging to the second partial intermediate block of the pair;

determining elements of the position designating array so as to specify the item values before merging when the elements of the order designating array are determined; and repeatedly selecting and pairing adjacent partial intermediate blocks and creating a new partial intermediate block including a merged item value array, and an order designating array and position designating array whose elements are determined so as to create one partial intermediate block finally, wherein the finally created partial intermediate block is an information block and wherein a value list includes the order designating array and the item value array.

According to the invention, partial intermediate blocks are paired, and the order of item values in the pair is determined by comparing the item values of the partial intermediate blocks. By pairing adjacent partial intermediate blocks sequentially so as to create a new partial intermediate block, that is, in a so-called tournament form, a larger partial intermediate block is created. According to the invention, when item values are all different for "n" records, the number of comparisons is about "$n*(\log_2(n)-1)$", that is, $0(n*\log(n))$. However, when only "m(n>m)" item values are different and when "m" is significantly smaller than "n", the number of comparisons may be reduced to about "n". Even when "m" is relatively large, the number of comparisons may be "$m*(\log_2(n)-1)$". In other words, the processing efficiency can be estimated. In addition, even when the processing efficiency is the worst, the processing efficiency may be $0(n*\log(n))$ at least.

Furthermore, since the so-called tournament form is applied, the comparisons of pairs of partial intermediate blocks may be suitably performed by multiple processors in parallel. Thus, the processing time can be significantly reduced.

According to a preferable embodiment of the invention, the step of determining elements of the order designating array includes the steps of creating a new order designating array, and comparing item values in a first partial intermediate block and item values in a second partial intermediate block, determining the higher one, and locating values of the order designating array in the first partial intermediate block or second partial intermediate block designated by the item values sequentially from the higher ones of the new order designating array.

The step of determining elements of the position designating array may include the steps of creating a position designation redefining array for designating the new order designating array, and locating elements for specifying values located in the new order designating array at corresponding positions in the position designation redefining array in the first partial intermediate block or second partial intermediate block when the values of the order designating array are located.

The method may further include a step of converting the values of the position designating array in the position designation redefining array and obtaining a new position designating array.

According to the invention, the value lists of information blocks may be an order designating array and an item value array. Alternatively, according to another embodiment, the method includes a step of, after creating one partial intermediate block finally, sequentially locating item values specified by elements positioned higher in the order designating array so as to create a new item value array in which the item values are located with no redundancy in a predetermined order.

The objects of the invention may be achieved by a computer readable storage medium storing a program including the above-described steps. Furthermore, the objects of the invention may be achieved by a program for causing a computer to perform the above-described steps.

BRIEF DESCRIPTION OF THE DRAWINGS

FIG. 3A is an example of table format data; FIGS. 3B to 3D are diagrams showing various information block examples based on table format data;

FIG. 4A is a diagram showing another example of table format data; FIGS. 4B and 4C are diagrams showing other examples of an information block based on the table format data;

FIGS. 6A and 6B are diagrams each showing a relationship between record numbers and item values for a given item and a complete information block according to the embodiment;

FIG. 10 is a flowchart showing processing at a step 904 in FIG. 9 in detail;

FIG. 11 is a flowchart showing a step 1005 in FIG. 10 in detail;

FIG. 12 is a flowchart showing steps 1007 and 1013 in FIG. 10 in detail;

FIG. 13 is a flowchart showing steps 1009 and 1011 in FIG. 10 in detail;

FIG. 14 is a flowchart showing a step 1014 in FIG. 10 in detail;

FIGS. 15A and 15B are a diagram showing an example where a new partial intermediate block is created by merging initial partial intermediate blocks;

FIG. 16 is a diagram showing processing for creating a new PV according to the embodiment;

FIGS. 17A and 17B are diagrams showing states where partial intermediate blocks are merged according to the embodiment;

BEST MODE FOR CARRYING OUT THE INVENTION

Figure 1:
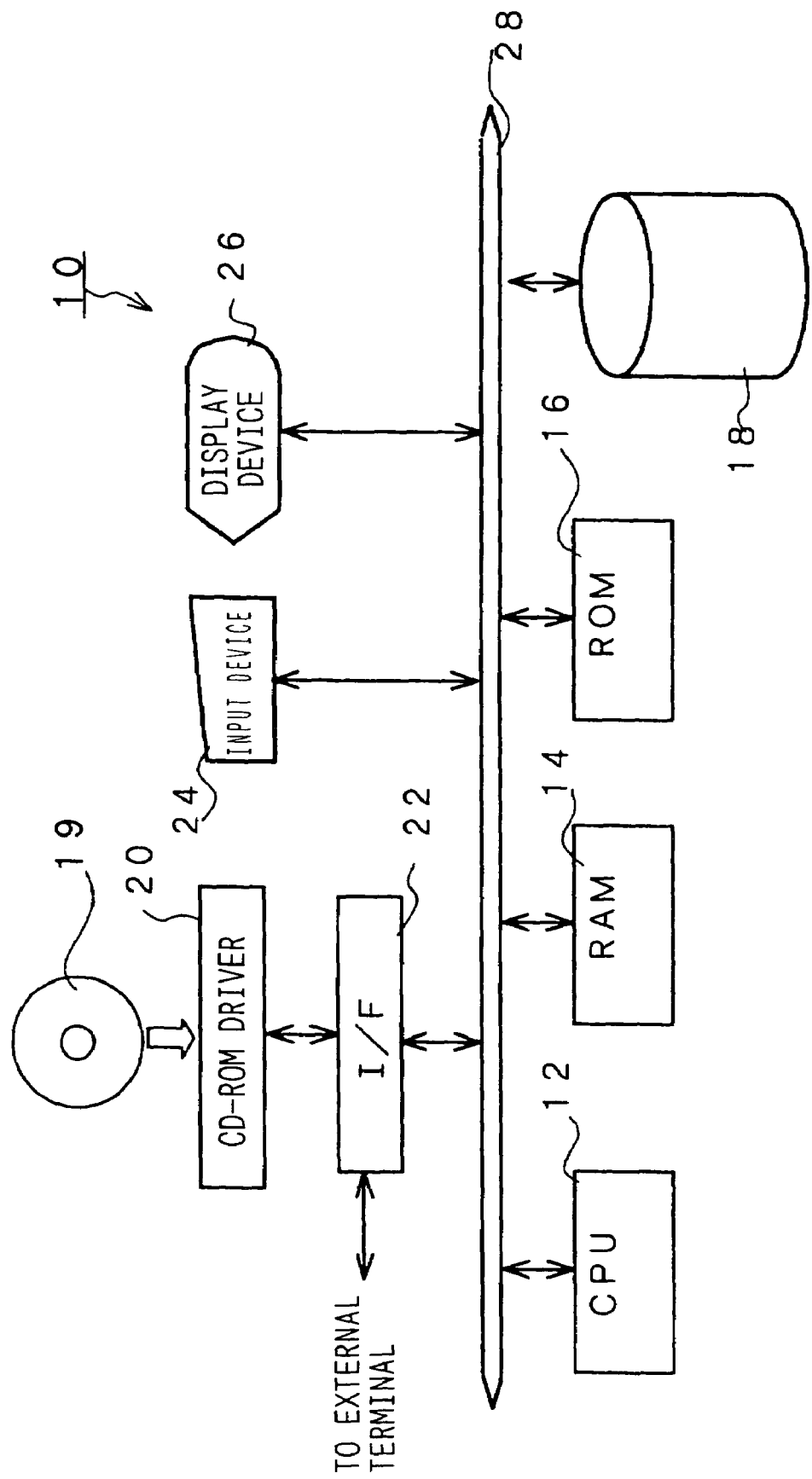
FIG. 1 is a block diagram showing a hardware configuration of a computer system, which can implement retrieving, summarizing and searching methods according to an embodiment of the invention.

An embodiment of the invention will be described below with reference to attached drawings. FIG. 1 is a block diagram showing a hardware configuration of a computer system, which can implement retrieving, summarizing and searching methods according to this embodiment of the invention. As shown in FIG. 1, a computer system 10 has the same configuration as the usual one. The computer system 10 includes a CPU 12 for controlling the entire system and individual components by executing programs, a Random Access Memory (RAM) 14 for storing work data and so on, a Read-Only Memory (ROM) 16 for storing programs and so on, a stationary memory medium 18 such as a hard disk, a CD-ROM driver 20 for accessing a CD-ROM 19, an interface (I/F) 22 for interfacing with external terminals connected to the CD-ROM driver 20 and external networks (not shown), an input device 24 including a keyboard and/or a mouse and a CRT display device 26. The CPU 12, the RAM 14, the ROM 16, the external memory medium 18, the I/F 22, the input device 24 and the display device 26 are connected to each other through a bus 28.

A program for compiling arbitrary table format data, program for creating a table (view) including a predetermined item from compiled table format data, retrieving program, summarizing program and sorting program according to this embodiment may be stored in the CD-ROM 19. Then, the CD-ROM 19 may be read by the CD-ROM driver 20. Alternatively, these programs may be stored in the ROM 16 in advance. The programs read from the CD-ROM 19 once may be stored in a predetermined area of the external memory medium 18. Alternatively, these programs may be supplied from the outside through a network (not shown), an external terminal and the I/F 22.

According to the present invention, arbitrary table format data is compiled to establish data having a form of information block set, which can be retrieved, be summarized and be sorted fast. The fast compiling method for establishing the data is an essential matter of the invention.

The present inventor has proposed a retrieving, summarizing and sorting method (JP-A-10-227278: PCT/JP99/04300), which uses data having a form of an information block set. Furthermore, the inventor has proposed a method for joining data and a method for deleting/adding/updating data by using data in the form (JP-A-11-151156: PCT/JP00/03465 and JP-A-11-215450: PCT/JP00/05135). First of all, a structure of these information blocks and searching by using the structure will be described. Then, creating the information blocks (compiling) will be described.

Figure 2:
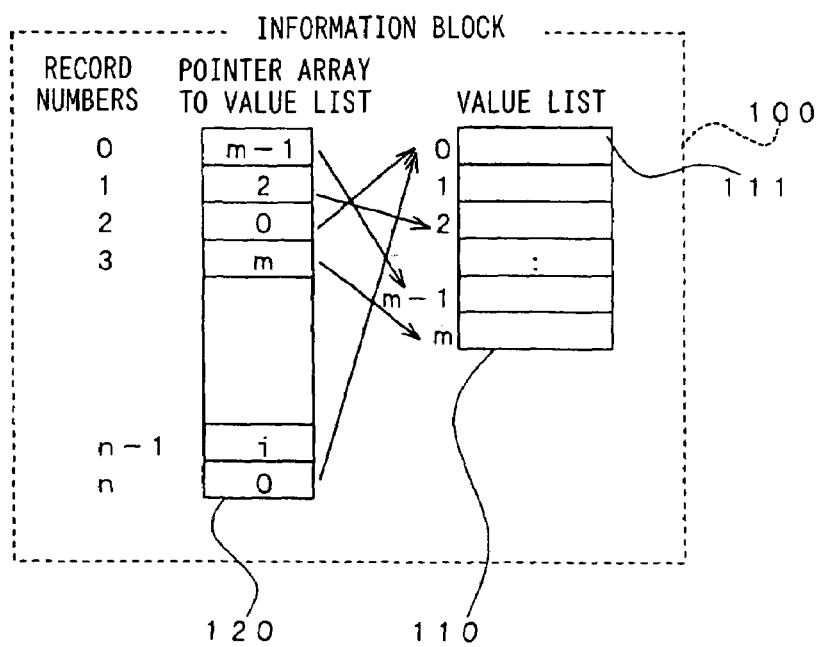
FIG. 2 is a diagram showing an information block used in the embodiment.

FIG. 2 is a diagram showing an information block used in this embodiment. As shown in FIG. 2, an information block 100 includes a value list 110 and a pointer array 120 to the value list. The value list 110 is a table storing item values 111 of each item in table format data, which corresponds to item value numbers. The item value numbers (integers) refer to order of item values belonging to a given item. The pointer array 120 to a value list is an array storing item value numbers of the column (that is, a given item) of table format data, that is, pointers to value list 110 arranged in an order of record numbers of the table format data.

By combining the pointer array 120 to the value list and the value list 110, when one record number is given, an item value number stored in accordance with the record number is taken out from the pointer array 120 to the value list relating to a predetermined item. Next, an item value stored in accordance with the item value number in the value list 110 is taken out. Thus, the item value can be obtained based on the record number. Therefore, like a conventional data table, all of data (item values) can be referenced by using coordinates including record numbers (rows) and items (columns).

Table format data shown in FIG. 3A is one of the examples. In this example, various item values are given to items including client ID's, names of clients and telephone numbers. According to this embodiment, the table format data is held as an information block in a form shown in FIGS. 3B to 3D. For example, in FIG. 3B, a pointer array 120-1 is associated with a value list 110-1 storing item values indicating client ID's. In other words, a pointer value of the pointer array to the first record (record number "0") is zero (0). Correspondingly, an item value "1" indicating the client ID may be obtained. In FIG. 3B, a pointer array 120-2 is associated with a value list 110-2 storing item values indicating names of clients. For example, a pointer value in the pointer array corresponding to the first record (record number "0") is "5". Correspondingly, an item value "Williams" indicating the name of the client may be obtained. In FIG. 3C, similarly and apparently, a pointer array 120-3 associated with a value list 110-3 storing item values indicting telephone numbers. In each of the value lists, item values are aligned in a predetermined order (in this example, in ascending order).

Furthermore, according to this embodiment, a value management table of the information block 100 includes the value list 110, a category number flag array used for retrieving and summarizing, a start position array indicating a first address of a memory space to store pointers corresponding to item values, and a cardinality array. Flags in the category number flag array and cardinalities in the cardinality array correspond to item values, respectively. A flag value of a category number flag is "0" normally and is set to "1" in accordance with an item value to be found when retrieving and/or summarizing. The cardinality corresponds to the number of records having a given item value. The start position corresponds to a sum of cardinalities corresponding to pointer values lower than the corresponding pointer value. Therefore, the start position is not always required.

FIG. 4A is a diagram showing another example of the table format data. FIGS. 4B and 4C are diagrams showing information blocks relating to "sex" and "ages", respectively. As shown in FIG. 4B, a value management table 210-1 of an information block 200-1 relating to "sex" includes item values ("male" and "female") corresponding to pointer values in a pointer array 220 and category numbers, start positions and cardinalities corresponding to the item values. For example, the number of records corresponding to a pointer value "0" (that is, the item value in the value list is "male") is 632,564. On the other hand, the number of records corresponding to a pointer value "1" (that is, the item value in the value list is "female") is 367,426. The start position corresponding to each of the item values designates the first address of a pointer array 230-1 to records, which will be described later. Apparently, the same is true in FIG. 4C.

Figure 5:
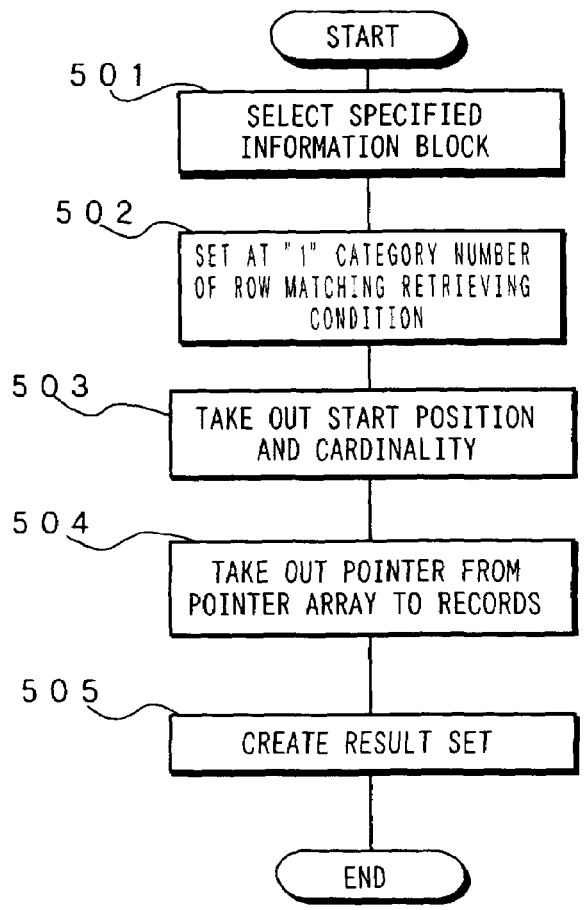
FIG. 5 is a flowchart showing a retrieving method for a single item.

An example of retrieving by using an information block having the data structure will be described. FIG. 5 is a flowchart showing a retrieving method with respect to a single item. The CPU 12 (see FIG. 1) executes a predetermined retrieving program so as to implement the processing. In this example, records whose item value for "ages" is 16 years or 19 years are retrieved. First of all, an information block 200-2 relating to "ages" showing in FIG. 4C is specified among information blocks relating to the table format data (step 501).

Next, in a value list 210-2 of the specified information block, a category number of a row having item values matching the retrieving condition (16 years or 19 years) is set at "1" (step 502). In this example, a category number of a row corresponding to an item value "0" and an item value number "3" is set to "1". Next, a start position and cardinality corresponding to the row of the category number set at "1" are obtained (step 503). These kinds of information are referred to as pointer taking-out information. Based on the pointer-taking-out information obtained at the step 503, record numbers indicting pointers to records matching with the retrieving condition are taken out from the pointer array to the records (step 504). In this example, the pointers to the records corresponding to the item value number "0" are stored in an area from the start position "0" that is, from the first, to the 45898th. On the other hand, the pointers to the records corresponding to the item value number "3" are stored in an area from the 2383137th to the 189653rd in the pointer array to the records. Finally for the uses in later processing, the array of the retrieved record numbers is created and is held as a result set (step 505).

The summarizing and sorting may be implemented by using category numbers, starting positions and cardinalities.

Next, compiling processing for creating the information block will be described. In the compiling processing, a value list is created. Data located randomly with respect to a given item are sorted without any redundancy in a given order (for example, in alphabetical order) the value list. FIG. 6A is a diagram showing records and item values for a given item (last name) in table format data. In the compiling processing according to this embodiment, as shown in FIG. 6A, an information block is created in a form as shown in FIG. 6B for an item having randomly located item values.

In FIG. 6B, an information block 600 includes a pointer array 601 to a value list (hereinafter referred to as "PV") and a value list 602. Immediately after the compiling processing, the value list 602 includes an array storing original item values (original item value array) 603 and array 604 (hereinafter referred to as "VLP") indicating storing position numbers of the original item value array 603. The pointer array (PV) may be a position designation array because item values in a value list are designated. In addition, the VLP may be a position designation array because the VLP designates an order of item values. The information block immediately after the compiling processing has a slightly different form from that of the above-described information block shown in FIG. 3B. However, the information block can have the same form by undergoing processing, which will be described later.

Figure 7:
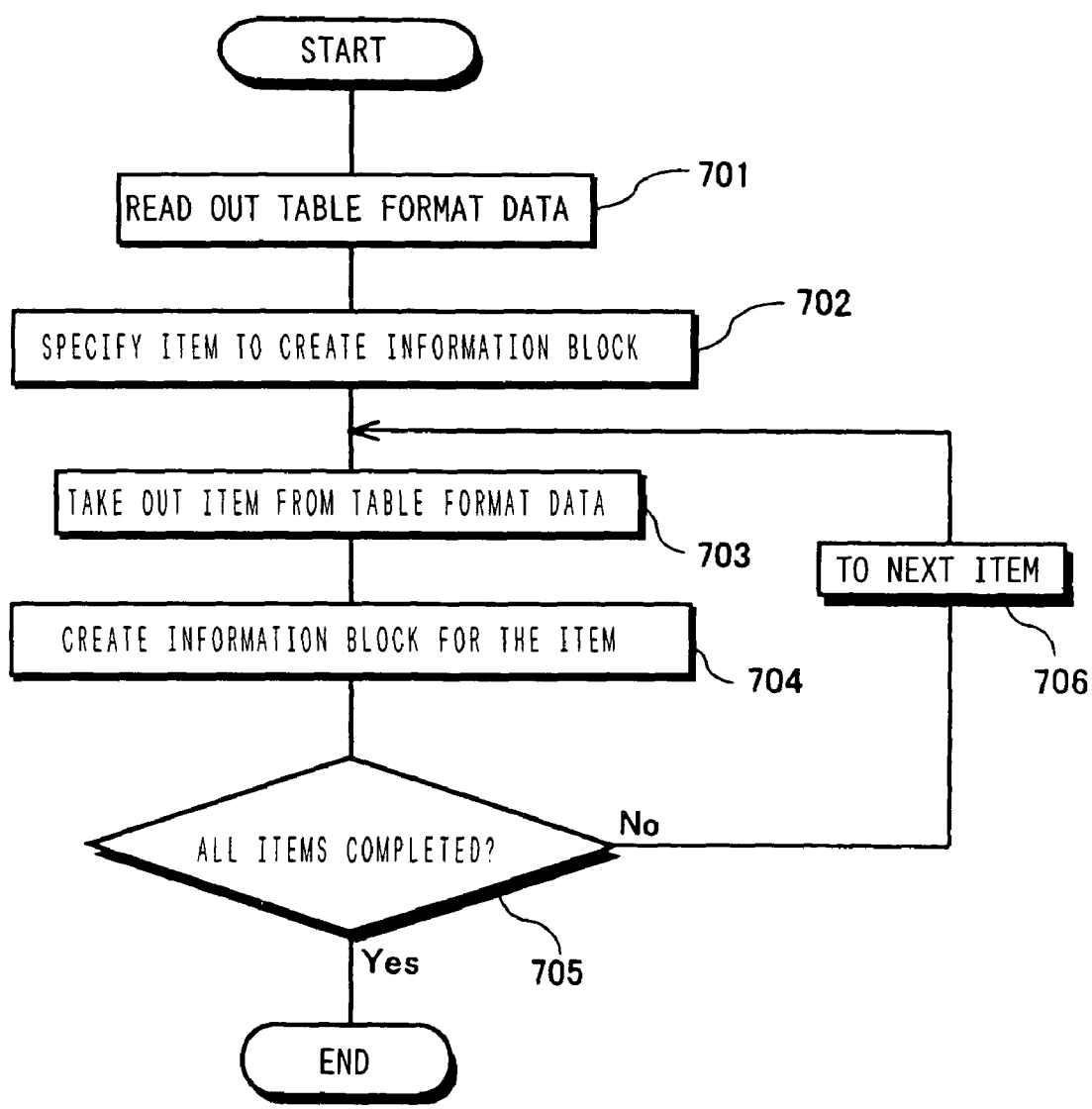
FIG. 7 is a flowchart showing an outline of compiling processing according to the embodiment.

FIG. 7 is a flowchart showing an outline of the compiling processing according to this embodiment. As shown in FIG. 7, in the compiling processing, the computer system 10 reads out table format data stored in the stationary memory medium 18, for example (step 701). Then, the computer system 10 identifies an item requiring the creation of an information block (step 702). For example, information blocks may be created for all of items. Alternatively, only the information block for a specified arbitrary item may be created. The read table format data is desirably held on the RAM 14 temporarily in view of processing time.

Next, the computer system 10 selects a predetermined item from the table format data. Then, the computer system 10 takes out data (item values) relating to the item by associating with record numbers (step 703). Thus, for example, data in the form shown in FIG. 6A may be taken out. Next, an information block for the item is created (step 704). The processing step will be described later in detail. The steps 703 and 704 are performed on all of the specified items (see steps 705 and 706). Thus, the information block for the predetermined item is completed.

Figure 8:
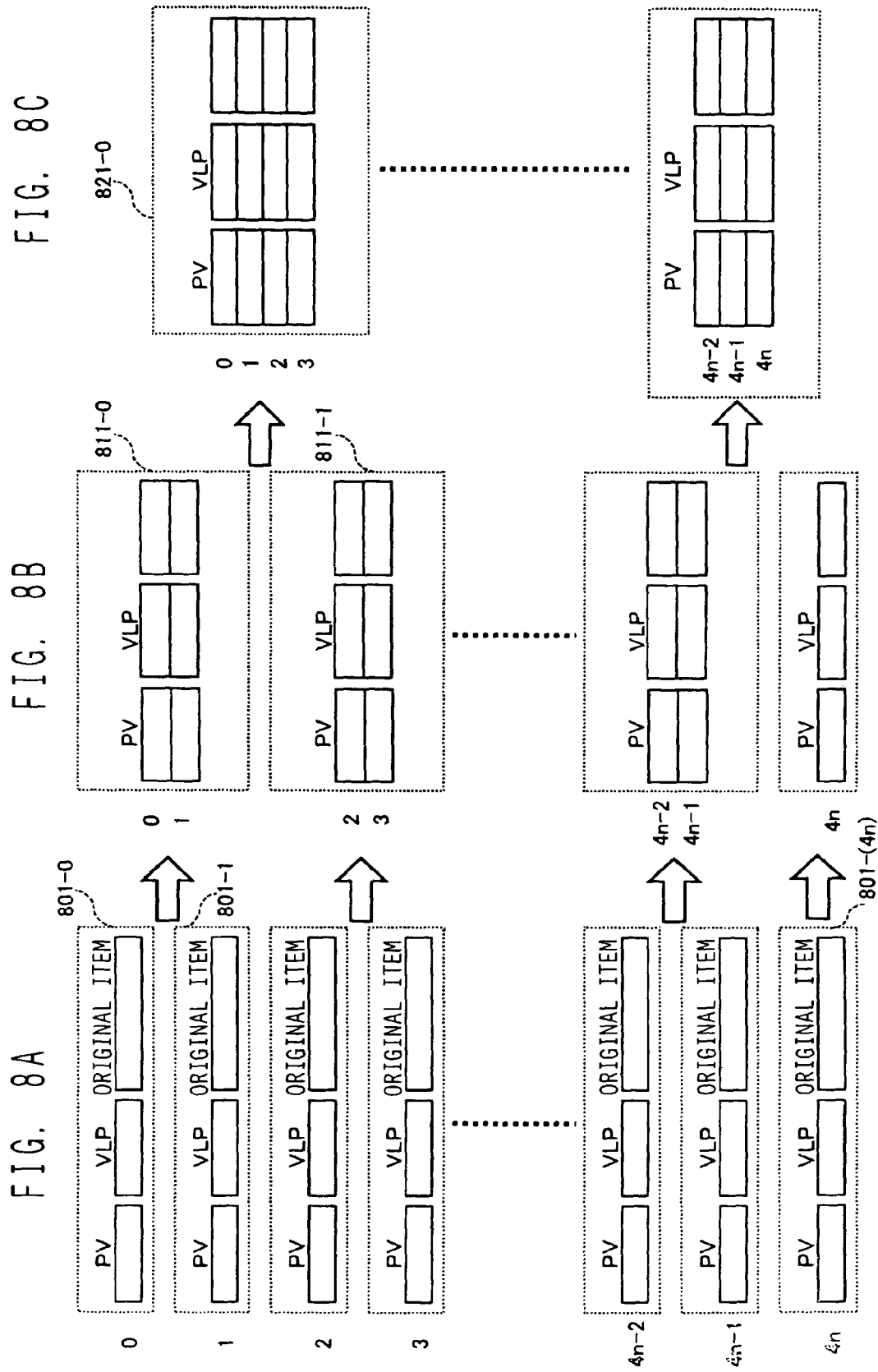
FIGS. 8A to 8C are diagrams showing examples of partial intermediate blocks in processing steps according to the embodiment.

Next, the processing at the step 704 will be described in detail. The processing at the step 704 is implemented by combining adjacent records sequentially and by determining values in a PV and/or a VLP in the combinations. For example, as shown in FIG. 8A, 4n+1 partial intermediate blocks 801-0 to 801-(4n) initially will be considered for items having record numbers 0 to 4n (the number of records=4n+1). Adjacent two partial intermediate blocks (for example, a partial intermediate block 801-0 and a partial intermediate block 801-1) are combined. Then, a new partial intermediate block (for example, a partial intermediate block 811-0) shown in FIG. 8B is considered. In the new partial intermediate block, values in the PV and VLP are updated. As shown in FIG. 8B, (2n+1) new partial intermediate blocks are created here.

Furthermore, adjacent two partial intermediate blocks (for example, partial intermediate blocks 811-0 and 811-1) are combined. As shown in FIG. 8C, a new partial intermediate block (for example, a partial intermediate block 821-0) is created. Then, values in the PV and VLP are updated in the new partial intermediate block.

Figure 9:
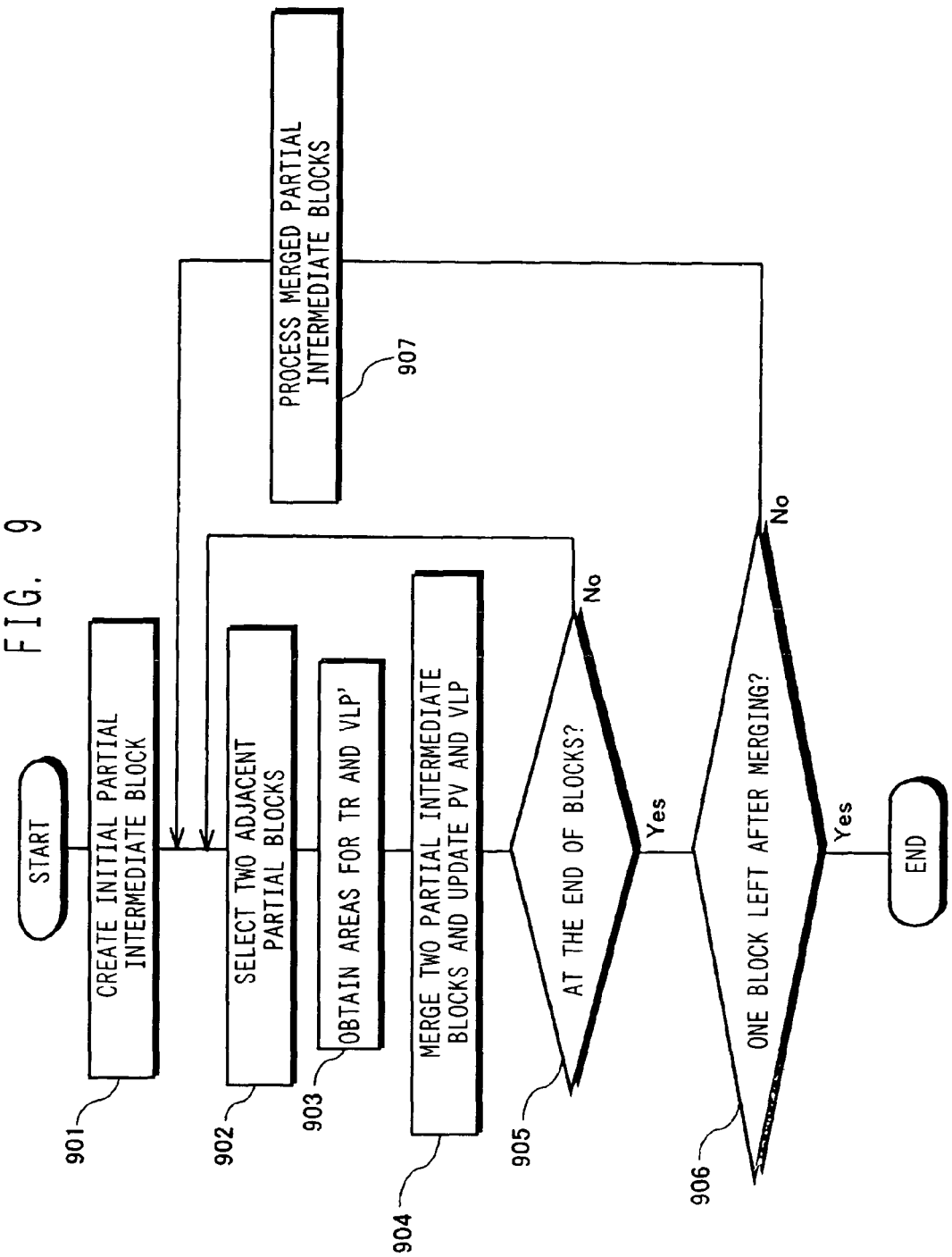
FIG. 9 is a flowchart showing an outline of processing for creating a new partial intermediate block by merging two partial intermediate blocks according to the embodiment.

By repeating the processing, a block combining two partial intermediate blocks can be created finally. The block is an information block. FIG. 9 is a flowchart indicating the processing.

Initial partial intermediate blocks created at a step 901 in FIG. 9 correspond to the partial intermediate blocks in FIG. 8A. Adjacent partial intermediate blocks are selected up to the end block (step 902). They are merged, and areas are obtained for a conversion array (hereinafter referred to as "TR") and/or for an array indicating new storing position numbers after the merge (hereinafter referred to as "VLP'") (step 903). Next, values in the PV and/or VLP of the merged ones are updated (steps 904 and 905). The TR is used for redefining the PV. Therefore, the TR may be a position designation redefining array.

When the partial intermediate blocks have been merged to the end in partial intermediate blocks at a certain level, and whether the number of the merged partial intermediate block is 1 or not is determined (step 906). Here, if the result is "Yes", the one partial intermediate block is a completed information block. On the other hand, if the result is "No", multiple merged partial intermediate blocks undergo the processing at the steps 902 to 905 again.

The processing in FIG. 9 and, especially, the processing at the steps 902 to 904 will be described in detail with reference to record numbers and item values corresponding to the item "last name" shown in FIG. 6A.

Figure 15A:
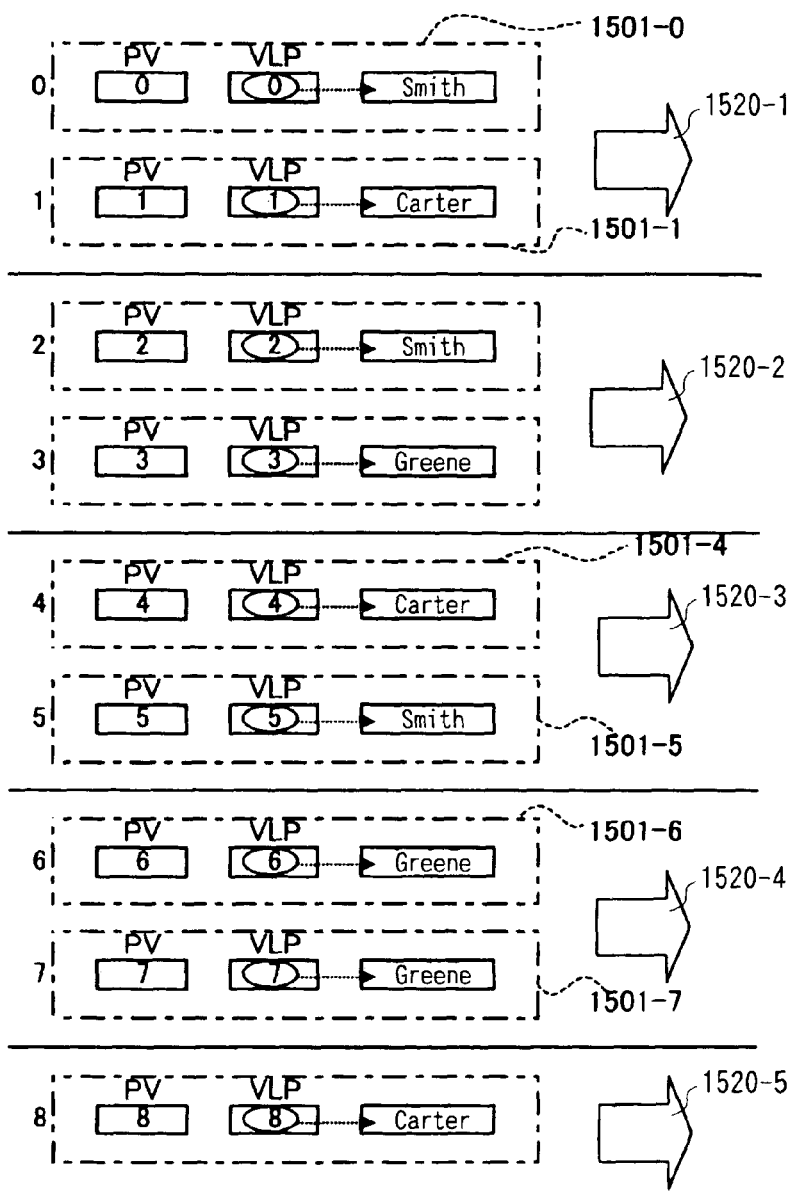

First of all, as shown in FIG. 15A, nine initial partial intermediate blocks are created (see the step 901 in FIG. 9). Here, the beginning partial intermediate blocks 1501-0 and 1501-1 are merged. Then, the PV and VLP are updated (see step 904 in FIG. 9).

FIG. 10 is a diagram showing the processing at the step 904 in detail. In the processing, ones for a smaller record number and for a larger record numbers of the two partial middle blocks to be merged are called first partial intermediate block and second partial intermediate block, respectively. A pointer located in the first partial intermediate block to designate a value in the VLP for indicating an item value to be compared is called first comparison position pointer. A pointer located in the second partial intermediate block to designate a value in the VLP for indicating an item value to be compared is called second comparison position pointer. In the beginning of the processing in FIG. 10, the comparison position pointer designates a VLP value having the smallest record number in each of the partial intermediate blocks. Furthermore, a pointer designating a position for storing a value in a VLP' created in the processing is called storing position pointer. The first comparison position pointer, the second comparison position pointer and the storing position pointer are set at the initial position (the beginning position in each VLP) before the processing in FIG. 10.

As shown in FIG. 10, the computer system 10 takes out an item value (first designated value) designated by the first comparing position pointer and an item value (second designated value) designated by the second comparing position pointer and compares these values (steps 1001 to 1003). Then, different processing is performed in accordance the large and small of the first designated value and second designated value or in accordance with positions of the first comparing pointer and second comparing pointer (see steps 1004 to 1014).

In partial intermediate blocks 1501-0 and 1501-1 shown in FIG. 15A, the first comparing position pointer initially designates "Smith" in the partial middle block 1501-0. On the other hand, the second comparing position pointer initially designates "Carter" in the partial intermediate block 1501-1. Therefore, their comparison (see a step 1003 in FIG. 10) results in "first designated value>second designated value" (see a step 1008). In this case, the method goes to a step 1009, where the processing shown in FIG. 13 is performed.

In more detail, a VLP value "1" corresponding to the item value "Carter" designated by the second comparing position pointer is specified (a step 1301). The VLP value "1" is stored at a position designated by the storing position pointer in the VLP' (the beginning position, that is, the position having the storing position number "0") (step 1302). Next, as a TR value corresponding to the position of the second comparing position pointer, a storing position number (in this case, "0") where the storing position pointer is located is given (step 1303).

Then, the computer system 10 moves the second comparing position pointer to one downstream side (a side where the storing position number becomes larger) (step 1304). In addition, the computer system 10 moves the storing position pointer to one downstream side (step 1305).

After the processing, the processing at the steps 1001 to 1003 is performed again. However, when the second comparing position pointer is moved to one downstream side in the above-described example, an item value designated by the second comparing position pointer does not exist. Therefore, the result is "Yes" here at a step 1012. Then, the processing in FIG. 12 is performed.

In more detail, the VLP value "0" corresponding to the item value "Smith" designated by the first comparing position pointer is identified (step 1201). The VLP value "0" is stored at a position designated by the storing position pointer in the VLP' (the second position, that is, a position indicated by the storing position number "1"). Next, as a TR value corresponding to a position of the first comparing position pointer, a storing position number (in this case, "1") indicating the position of the storing position pointer is given (step 1203). Then, the second comparing position pointer is moved to one downstream side (the side where the storing position number becomes larger) (step 1204). The storing position pointer is also moved to one downstream side (step 1205).

The steps 1001 to 1003 are performed again. However, both item values designated by the first comparing position pointer and second comparing position pointer do not exist. Therefore, the results are "No" at the steps 1004 to 1012. Then, the processing goes to a step 1014.

In more detail, in the first partial intermediate block (see a reference numeral 1501-0 in FIG. 15A), the PV value is converted to a corresponding TR value to create a new PV value (step 1401). In the second partial intermediate block (see a reference numeral 1501-1 in FIG. 15A), the PV value is converted to corresponding TR value to create a new PV value (step 1402). FIG. 16 specifically describes the creation of new PV and VLP values. For example, an element (value) "0" of a PV (old PV) 1601 in the first partial intermediate block 1501-0 is taken out, and an element (value) of a TR 1602 having a storing position number designated by the element is specified. Because the element (value) is "1", the element "0" of the old PV may be stored at the position in a new PV 1603 which is designated by the storing position number designated by the element of the TR. In the second partial intermediate block, the same processing is performed. Thus, a new PV can be performed.

A VLP' created by repeating the processing at the steps 1001 to 1013 in FIG. 10 becomes a new VLP (see step 1403 and a reference numeral 1604 in FIG. 16).

The processing in FIG. 10 is performed on the other partial intermediate block sets to create new PV's and new VLP's. The processing performed on the other partial intermediate block sets will be described by focusing on the part, which has not described yet, in the processing in FIGS. 10 to 14. For example, the first comparing position pointer initially designates "Carter" in the partial intermediate block 1501-4 in FIG. 15A. On the other hand, the second comparing position pointer designates "Smith" in the partial intermediate block 1501-5 in FIG. 15A. Their comparison results in "first designated value<second designated value" (Yes at a step 1006). The processing goes to a step 1007, where the processing in FIG. 12 is performed.

In FIG. 12, a VLP value "4" corresponding to the item value "Carter" designated by the first comparing position pointer is specified (step 1201). Then, the VLP value "4" is stored at a position (a position of the storing position number "4") designated by the storing position pointer in the VLP' (step 1202). Next, as a TR value corresponding to the position of the first comparing position pointer, the storing position number (in this case, "4") where the storing position pointer is located is given (step 1203).

Then the computer system 10 moves the first comparing position pointer to one downstream side (the side where the storing position number becomes larger) (step 1204). The storing position pointer is also moved to one downstream side (step 1205).

After the above-described processing, the processing at the steps 1001 to 1003 is performed again. However, in this example, when the first comparing position pointer is moved to one downstream side, an item value designated by the first comparing position pointer does not exist. Therefore, the result is "Yes" at a step 1010 here. Then, the processing shown in FIG. 13 is performed.

In the processing in FIG. 13, a VLP value "5" corresponding to an item value "Smith" designated by the second comparing position pointer is specified. The VLP value "5" is stored at a position, in the VLP', designated by the storing position number "5" (steps 1301 and 1302). As a TR value corresponding to the second comparing position pointer, the storing position number "5" is given (step 1303). Next, the second comparing position pointer and storing position pointer are moved to one downstream side (steps 1304 and 1305).

Here, item values designated by both of the first comparing position pointer and second comparing position pointer do not exist. Therefore, the processing goes to a step 1014, where a new PV and a new VLP are created (see steps 1401 to 1403).

Next, the first comparing position pointer initially designates "Greene" in a partial intermediate block 1501-7 in FIG. 15A. On the other hand, the second comparing position pointer designates "Greene" in the partial intermediate block 1501-7 in FIG. 15A. Their comparison results in "first designation value=second designation value" (Yes at a step 1004). Then, the processing goes to a step 1005.

In FIG. 11, a VLP value "6" corresponding to the item value "Greene" designated by the first comparing position pointer is specified (step 1101). Then, the VLP value "6" is stored at a position (that is, the position of the storing position number "6"), in the VLP', designated by the storing position pointer (step 1102). Next, as a TR value corresponding to the first comparing position pointer, the storing position number "6" where the storing position pointer is located is given (step 1103). Then, the first comparing position pointer is moved to one downstream side.

Similarly, as a TR value corresponding to the position of the second comparing position pointer, the storing position number "6" where the storing position pointer is located is given (step 1105). Then, the second comparing position pointer is moved to one downstream side (step 1106).

In this way, when the same item values exist in both of the partial intermediate blocks, the value is stored in the VLP' by eliminating the duplication.

In the subsequent processing, no item values designated by the first comparing position pointer and the second comparing position pointer exist. The processing goes to the processing in FIG. 4, where a new PV and a new VLP are created.

In this way, new partial intermediate blocks as indicated by reference numerals 1511-0 to 1511-4 in FIG. 15B can be obtained. The processing in FIGS. 9 to 14 is performed on these partial intermediate blocks. Here, as shown in FIG. 17A, the partial intermediate block 1511-0 is left as it is. The partial intermediate blocks 1511-1 and 1511-2 and the partial intermediate blocks 1511-3 and 1511-4 are paired. The processing is performed on each of the pairs of partial intermediate blocks.

Figure 18A:
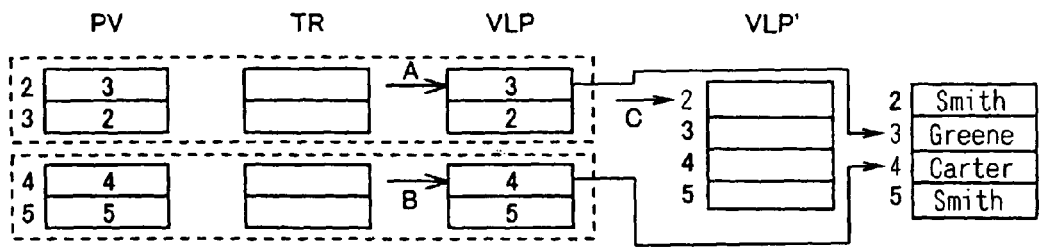
FIGS. 18A to 18D are diagrams each for explaining processing for merging partial intermediate blocks according to the embodiment.

The processing on the pair of the partial intermediate blocks 1511-1 and 1511-2 will be descried again with reference to the flowchart. As indicated by arrows A, B and C in FIG. 18A, initially a first comparing position pointer, a second comparing position pointer and a third comparing position pointer are located at the beginnings of the VLP'S and VLP'.

In FIG. 10, an item value "Greene" specified by a VLP value "3" designated by the first comparing position pointer (the arrow A in FIG. 18A) is taken out (see a step 1011). On the other hand, an item value "Carter" specified by a VLP value "4" designated by the second comparing position pointer (the arrow B in FIG. 18A) is taken out (step 1012).

Figure 18B:
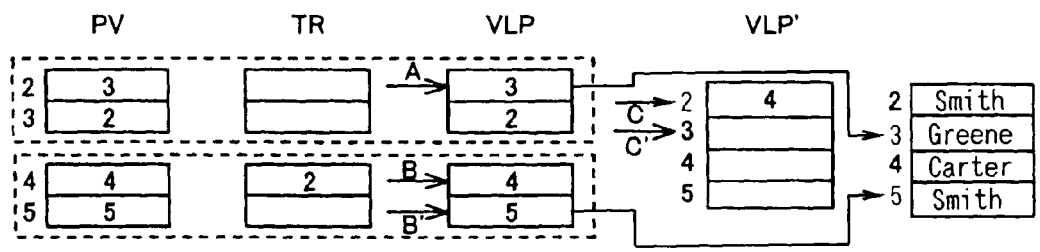

The comparison between the first designated value "Greene" and the second designated value "Carter" results in "first designated value>second designated value" (Yes at the step 1008). Therefore, the processing in FIG. 13 is performed. Thus, as shown in FIG. 18B, the VLP value "4" and a predetermined value in the TR are located at a position designated by the storing position pointer (arrow C). Then, the second comparing position pointer and the storing position pointer are moved to one downstream side (see arrows B' and C').

Figure 18C:
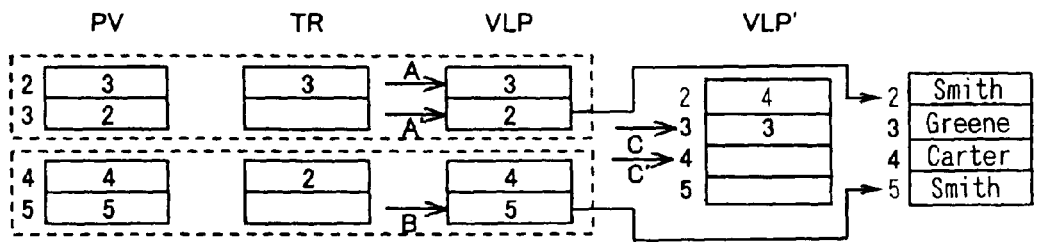

Next, the item value "Greene" specified by the VLP value "3" designated by the first comparing position pointer (arrow A in FIG. 18B) and an item value "Smith" specified by a VLP value "5" designated by the second comparing position pointer (arrow B' in FIG. 18B) are compared (steps 1001 to 1003 in FIG. 10). In this case, the first designated value<the second designated value. Therefore, the processing goes to the step 1007. As shown in FIG. 18C, the VLP value "3" designated by the first comparing position pointer and a predetermined TR value are located at the position designated by the storing position pointer (arrow C in FIG. 18C). Then, the first comparing position pointer and the storing position pointer are moved to one downstream side (see arrows A' and C').

Figure 18D:
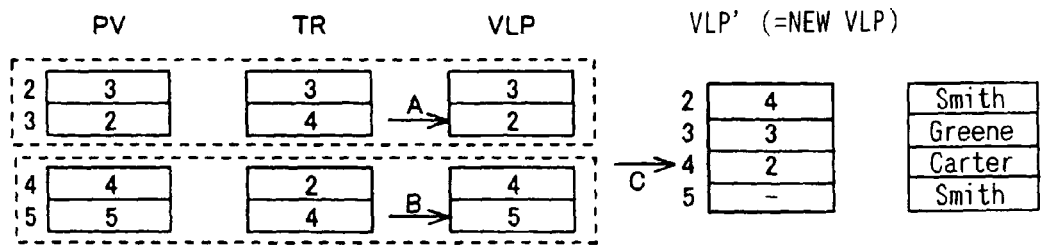

Furthermore, the item value "Smith" specified by the VLP value "2" designated by the first comparing position pointer (arrow A' in FIG. 18C) and the item value "Smith" specified by the VLP value "5" designated by the second comparing position pointer (arrow B in FIG. 18C) are compared (steps 1001 to 1003 in FIG. 10). In this case, the first designated value=the second designated value. Therefore, the processing goes to the step 1005. Here, as shown in FIG. 18D, the VLP value "2" designated by the first comparing position pointer is located at the position designated by the storing position pointer (arrow C). As a TR value corresponding to the positions designated by the first comparing position pointer and second comparing position pointer, a storing position number "4" designated by the storing position pointer is located therein.

After this processing, the processing in FIG. 10 is performed again. Then, the processing goes to the step 1014. Here, an old PV is converted in the TR to create a new PV. The old PV value is taken out, and a TR value at a position designated by the value is specified. The TR value is located at a position in the new PV corresponding to the position of the value from which the old PV is taken out. By repeating this processing, a new PV 2001 can be obtained as shown in FIG. 20B.

Figure 19A:
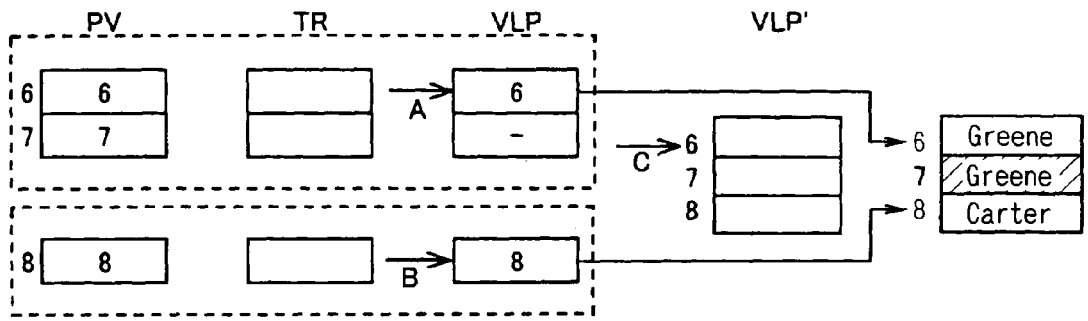
FIGS. 19A to 19C are diagrams each for explaining processing for merging partial intermediate blocks according to the embodiment.
Figure 19B:
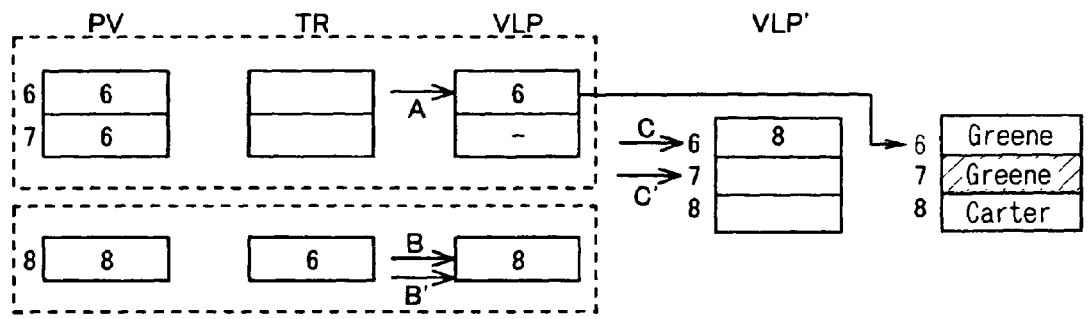
Figure 19C:
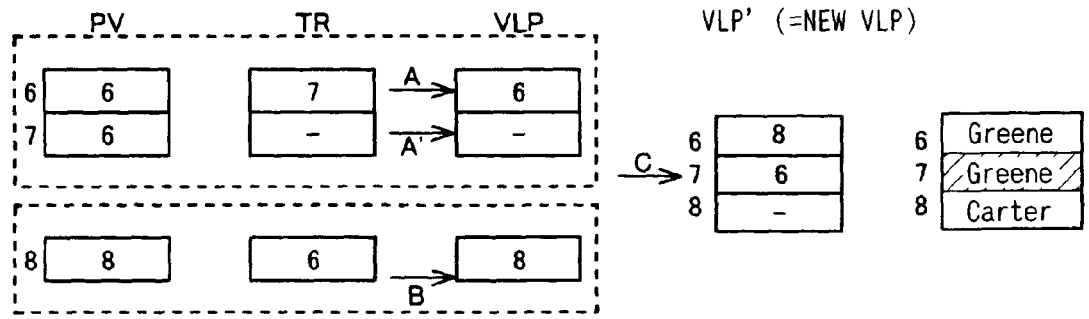

Next, processing to be performed on the pair of the partial intermediate blocks 1511-3 and 1511-4 will be described briefly. Here, the same processing as the one performed on the previous partial intermediate block set is also performed. For example, by performing the processing in FIG. 10 first, as shown in FIG. 19B, a VLP value "8" designated by the second storing position pointer (arrow B in FIG. 19B) is located at a position of the storing position pointer (arrow C in FIG. 19B). In addition, the corresponding TR value "6" is determined. By performing the processing in FIG. 10 next, as shown in FIG. 19C, the VLP value "6" designated by the first comparing position pointer (arrow A in FIG. 19A) is located at a position of the storing position pointer (arrow C in FIG. 19C). In addition, a predetermined TR value (a TR value corresponding to the position designated by the first comparing position pointer and second comparing position pointer) is determined.

Figure 20A:
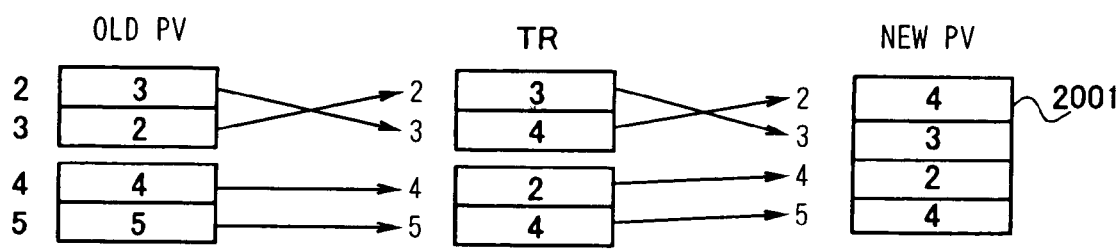
FIGS. 20A and 20B are examples each showing processing for creating a new PV according to the embodiment.
Figure 20B:
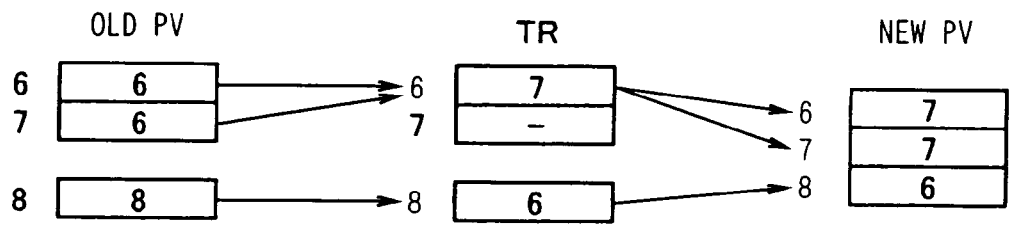

Finally, by performing the processing in FIG. 10 again, a new PV is created at the step 1014 (see FIG. 20B).

Thus, partial intermediate blocks as indicated by reference numerals 1701-1 and 1701-2 in FIG. 17A can be created.

Furthermore, in this example, the partial intermediate block 1701-0 (which is actually the same as the partial intermediate block 1501-0) and the partial intermediate block 1701-1 are merged. Here, the processing shown in FIG. 10 is also repeated. Item values specified by the VLP values designated by the comparing position pointers of the partial intermediate blocks 1701-0 and 1701-1 are compared. Based on the comparison result, the VLP' value and TR value are sequentially determined.

Figure 21A:
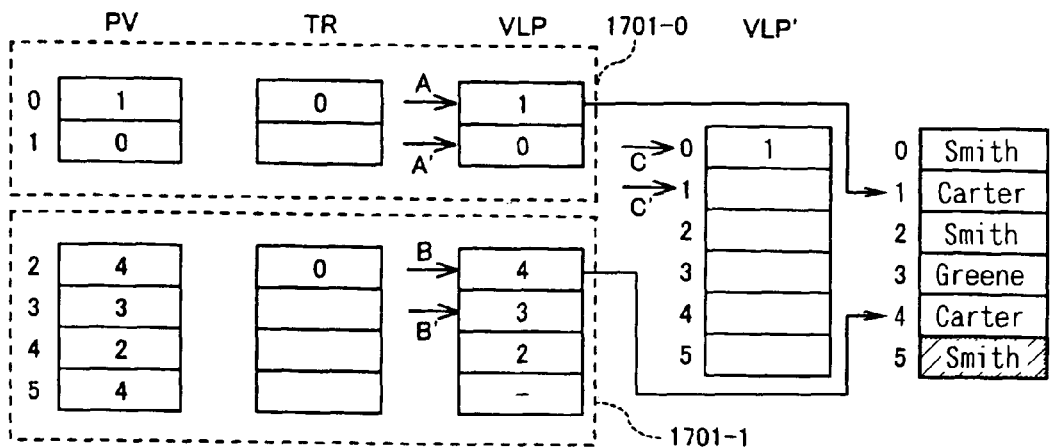
FIGS. 21A to 21C are diagrams each for explaining processing for merging partial intermediate blocks according to the embodiment.

As shown in FIG. 21A, the processing in FIG. 10 is performed on the partial intermediate block 1701-0 and the partial intermediate block 1701-1. As shown in FIG. 21A, in the first performed processing in FIG. 10, an item value "Carter" specified by a VLP value "1" designated by the first comparing position pointer (arrow A in FIG. 21A) is compared with an item value "Carter" specified by a VLP value "4" designated by the second comparing position pointer (arrow B in FIG. 21B). Based on the comparison result, the processing in FIG. 11 (step 1005) is performed. Thus, a value "1" in the VLP' indicated by the storing position pointer (arrow C in FIG. 21A) is determined. In addition, a value "0" in the TR corresponding to the first and second comparing position pointers is determined.

Figure 21B:
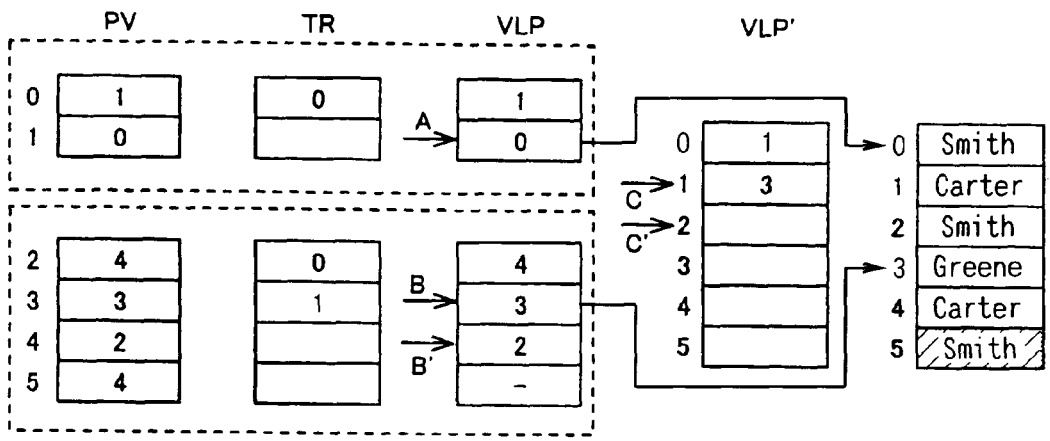

As shown in FIG. 21B, in the next processing in FIG. 10, an item value "Smith" specified by the VLP value "0" designated by the first comparing position pointer (arrow A in FIG. 21A) is compared with an item value "Greene" specified by the VLP value "3" designated by the second comparing position pointer (arrow B in FIG. 21B). Based on the comparison result, the processing in FIG. 13 (step 1009) is performed. Thus, a value "3" in the VLP' designated by the storing position pointer (arrow C in FIG. 21B) is determined. In addition, a value "1" in the TR corresponding to the second comparing position pointer is determined.

Figure 21C:
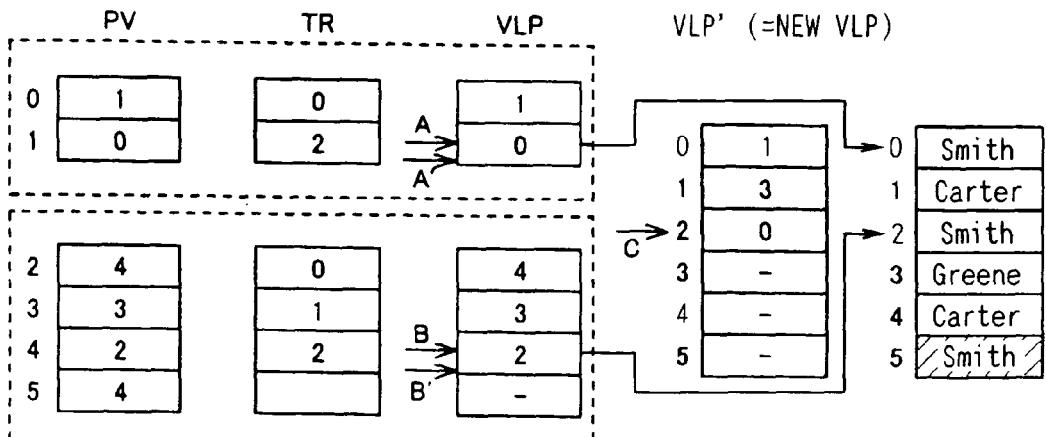
Figure 23A:
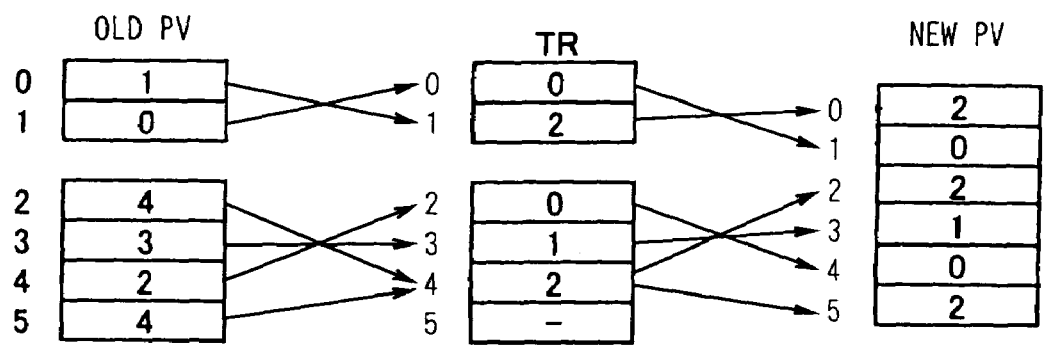
FIGS. 23A and 23B are diagrams each showing processing for creating a new PV according to the embodiment.

Furthermore, as shown in FIG. 21C, in the next processing in FIG. 10, an item value "Smith" specified by the VLP value "0" designated by the first comparing position pointer (arrow A in FIG. 21C) is compared with an item value "Smith" specified by the VLP value "2" designated by the second comparing position pointer (arrow B in FIG. 21C). Based on the comparison result, the processing in FIG. 11 (step 1005) is performed. Thus, a value "0" in the VLP' designated by the storing position pointer (arrow C in FIG. 21C) is determined. In addition, a value "2" in the TR corresponding to the first and second comparing position pointers is determined. In the processing in FIG. 10, which is performed after this, no VLP values designated by the first comparing position pointer and second comparing position pointer exist. Therefore, the processing in FIG. 14 (step 1014) is performed. Thus, the PV (old PV) value is converted in the related TR. Thus, a new PV can be obtained (see FIG. 23A).

Figure 17B:
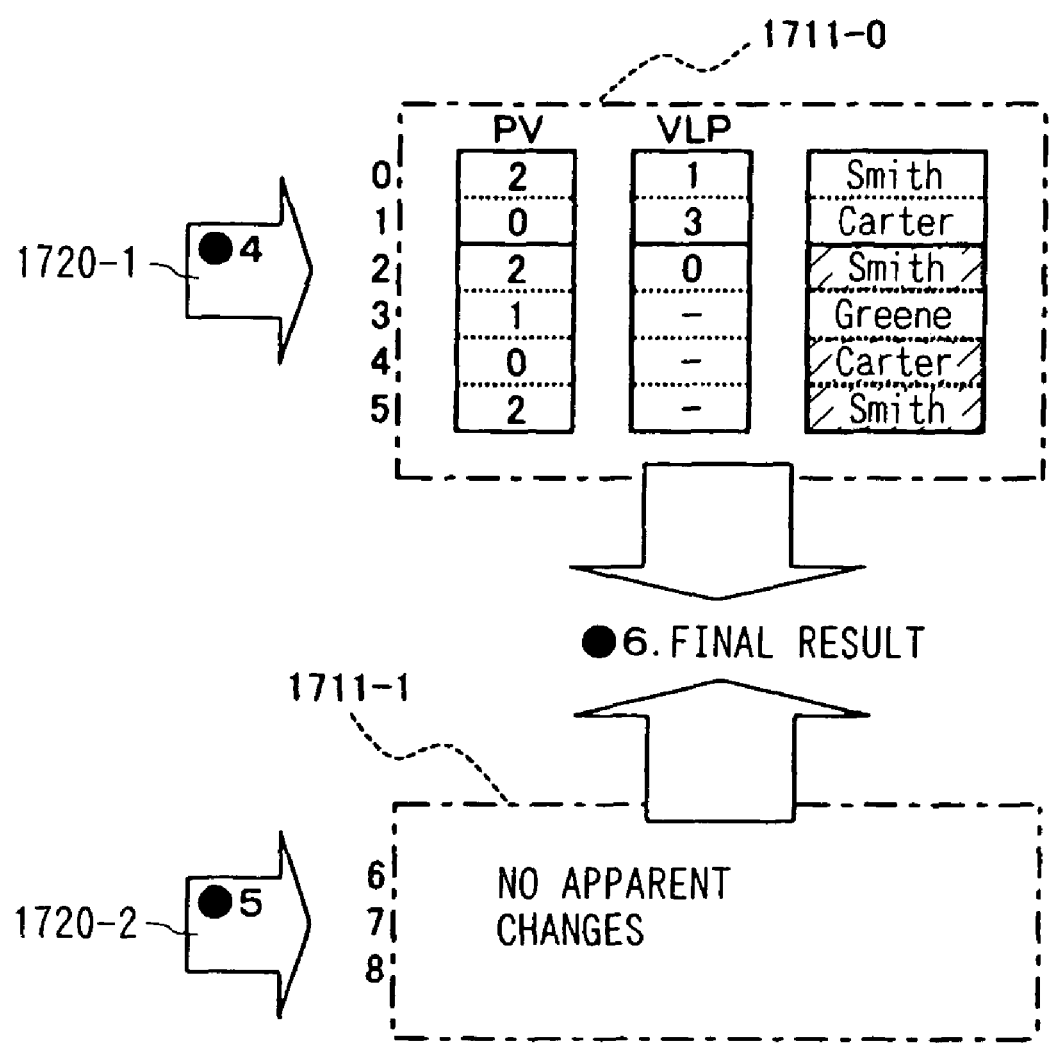

By performing the above-described processing, a partial intermediate block as indicated by a reference numeral 1711-0 in FIG. 17B is created. Finally, the partial intermediate block 1711-0 and the partial intermediate block 1711-1 (which is actually the same as the partial intermediate block 1701-2) are paired. Then, predetermined processing is performed on the partial intermediate block pair.

Figure 22A:
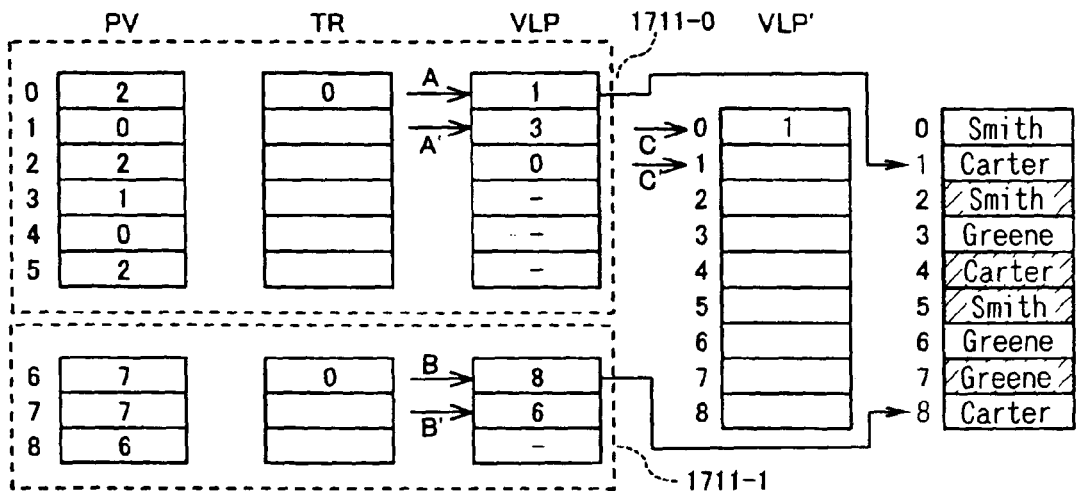
FIGS. 22A to 22C are diagrams each for explaining processing for merging partial intermediate blocks according to the embodiment.

The processing to be performed on the pair of the partial intermediate blocks 1711-0 and 1711-1 will be described with reference to the flowchart and so on. For example, in the processing in FIG. 10 first of all, as shown in FIG. 22A, an item value "Carter" specified by the VLP value "1" designated by the first comparing position pointer (arrow A in FIG. 22A) is compared with an item value "Carter" specified by the VLP value "8" designated by the second comparing position pointer (arrow B in FIG. 22B). Based on the comparison result, the processing in FIG. 11 (step 1005) is performed. Thus, a value "1" in the VLP' designated by the storing position pointer (arrow C in FIG. 22A) is determined. In addition, a value "0" in the TR corresponding to the positions of the first and second comparing position pointers is determined.

Figure 22B:
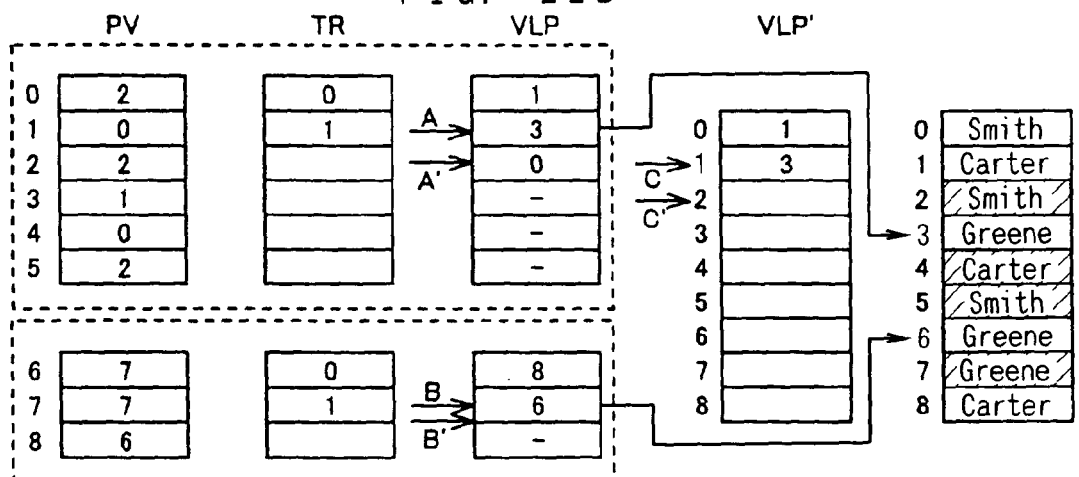

As shown in FIG. 22A, in the next processing in FIG. 10, an item value "Greene" specified by the VLP value "3" designated by the first comparing position pointer (arrow A in FIG. 22A) is compared with an item value "Greene" specified by the VLP value "3" designated by the second comparing position pointer (arrow B in FIG. 22B). Based on the comparison result, the processing in FIG. 11 (step 1005) is performed. Thus, a value "3" in the VLP' designated by the storing position pointer (arrow C in FIG. 22B) is determined. In addition, a value "1" in the TR corresponding to the positions of the first and second comparing position pointers is determined.

Figure 22C:
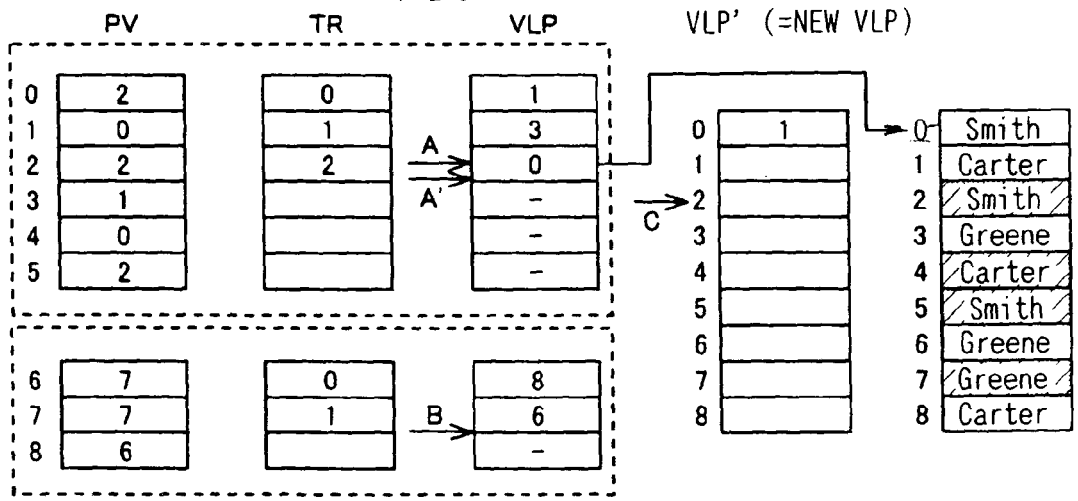
Figure 23B:
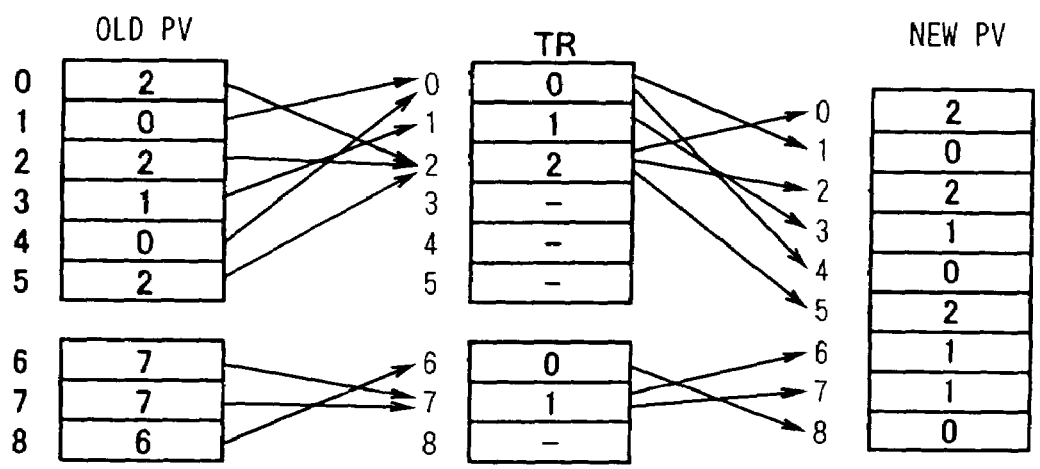

Furthermore, as shown in FIG. 22C, in the next processing in FIG. 10, the VLP value "0" designated by the first comparing position pointer (arrow A in FIG. 22C) exists. However, no VLP values designated by the second comparing position pointer (arrow B in FIG. 22C) exist. Therefore, the processing in FIG. 12 (step 1013) is performed. Here, the VLP' value "0" designated by the storing position pointer (arrow C in FIG. 22C) is determined. In addition, a value "2" in the TR corresponding to the first comparing position pointer is determined. In the processing in FIG. 10, which is performed after this, no VLP values designated by the first comparing position pointer and second comparing position pointer exist. Therefore, the processing in FIG. 14 (step 1014) is performed. Thus, the PV (old PV) value is converted in the related TR. Thus, a new PV can be obtained (see FIG. 23B).

In this way, as shown in FIG. 6B, an information block 600 can be obtained which has a value list 602 including a VP 601, a VLP 604 and an original item value array 603. Here, in the original item value array, only the elements (item values) "Smith", "Carter" and "Greene" (see reference numerals 610, 611 and 613) corresponding to the storing position numbers "0", "1" and "3" are actually used. Apparently, the other elements (item values) (for example, reference numerals 612 and 614) are not used, that is, are not designated by VLP values. In other words, when the same item values exist in the original item value array, one having the smallest storing position number is only used. The others are not used.

The fact that the information block in this form is equivalent to the information block shown in FIG. 3B will be described below. For example, in FIG. 6A, the item value "Smith" is specified in accordance with the record number "0". Also in FIG. 6B, an element (value) "2" is specified in the PV in accordance with the record number "0". When an element (value) in the VLP is specified such that the element "2" can be the storing position number, "0" can be obtained. Furthermore, the item value "Smith" in the original item value array whose storing position number is the VLP element (value) "0" can be obtained. Apparently, the item values can be specified similarly for the other record numbers.

Therefore, by using the value list 602 including the VLP 604 and original item value array 603 shown in FIG. 6B, the retrieving, summarizing and sorting can be performed. However, in this case, the original item value array is used as it is. Clearly from FIG. 6B, when the same item values exist in the original item value array, only the one having the smallest storing position number is used. The other item values are not used. Therefore, when many overlaps exist, many parts are not used in the original item value array. By storing, in a new array, an item value designated by a VLP value, an item value array with no redundancy (compression type value list) can be created.

Figure 24:
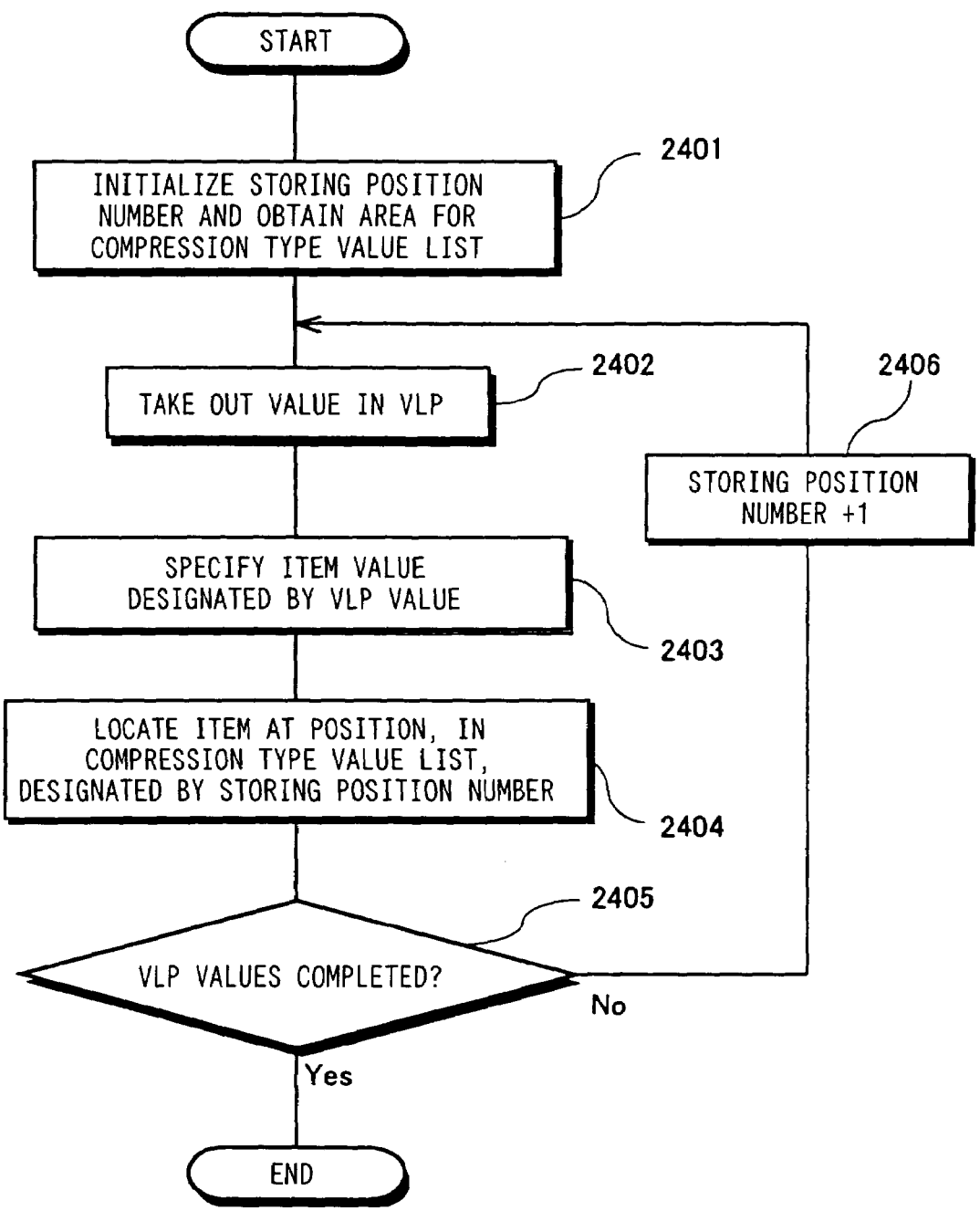
FIG. 24 is a flowchart showing processing for creating a compression type value list according to the embodiment.

FIG. 24 is a flowchart showing processing for creating a compression type value list. As shown in FIG. 24, the computer system 10 initializes the storing position number and obtains an area for the compression type value list (step 2401). The number of records for data (item values) located in this area corresponds to the number of values included in the VLP. Therefore, the obtained area corresponds to the number of the values.

Figure 25A:
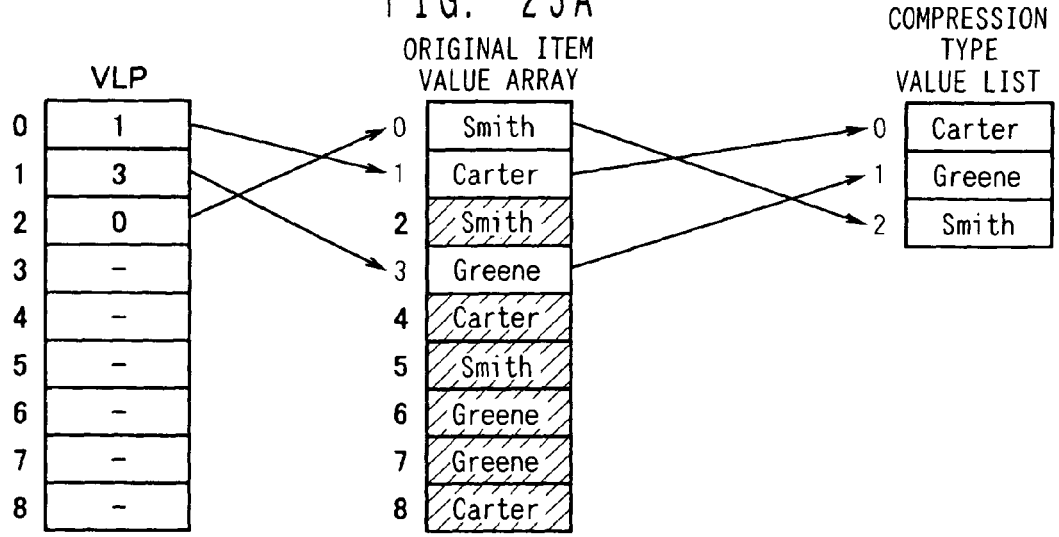
FIGS. 25A and 25B are diagrams for explaining processing for creating a compression type value list according to the embodiment.

Next, a value in the VLP designated by the storing position number is taken out (step 2402). An item value in the original item array designated by the value of the VLP is specified (step 2403). Then, the specified item value is located at a position designated by the storing position number in the compression type value list (step 2404). This processing is performed on all of the values in the VLP (see steps 2405 and 2406). For example, when the processing in FIG. 24 is performed on the value list 602 shown in FIG. 6B, an item value (for example, "Carter") in the original item value array is specified by a value (for example, a value "1" designated by the storing position number "0") in the VLP (steps 2402 and 2403), as shown in FIG. 25A. Then, the item value is located at a position (for example, at a position of "0") designated by the storing position number of the compression type value list.

Figure 25B:
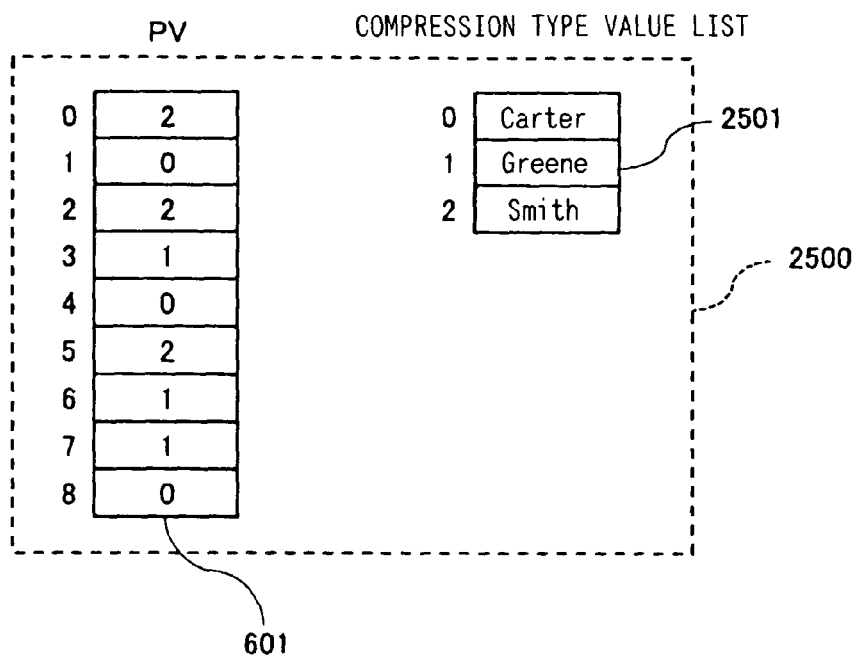

As a result of the processing, the information block 600 shown in FIG. 6B is converted to an information block 2500 having the PV 601 and the compression type value list 2501, as shown in FIG. 25B. The newly obtained information block 2500 apparently has the same form of the information block shown in FIG. 3B. Based on the information block 2500 resulted from the processing in FIG. 24, processing for retrieving, summarizing and sorting can be apparently performed.

An array obtained by merging two partial intermediate blocks by repeating processing shown in FIG. 10 in the compiling processing will be further described. For example, the VLP' and the item value array in FIG. 18D are referenced. An element (value) "Carter" in the item value array (see a reference numeral 1802) is specified by a value "4" stored at a position of the storing position number "2" in the VLP' (see a reference numeral 1801), which is a new VLP. An element (value) "Greene" in the item value array 1802 is specified by a value "3" stored at a position of the storing position number "3" in the new VLP 1801. An element (value) "Smith" in the item value array 1802 is specified by a value "2" stored at a position of the storing position number "4" in the new VLP 1801. Thus, a value list related to merged partial intermediate blocks is created from the new VLP and item value array. In the value list, the item values are sorted. In other words, the value list of the partial intermediate block is created by merging the two partial intermediate blocks by repeatedly performing the processing in FIG. 10 on the two partial intermediate blocks. In the value list, item values are arranged in a predetermined order with no redundancy.

A processing speed in the data compiling method having the above-described construction will be further described. Here, for simple description, the value lists are not in the forms of the VLP and item value array. However, values in an item value array are specified by values in the VLP, respectively. Therefore, the value list is in a form of an array including the specified values (compression type value list).

Figure 26:
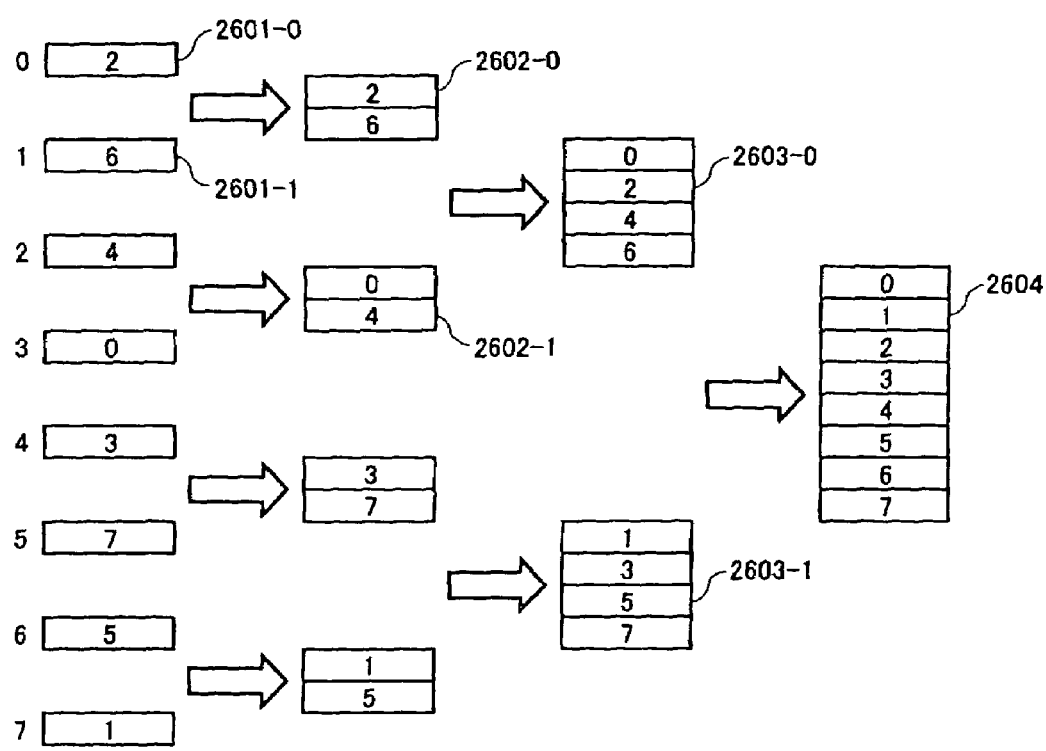
FIG. 26 is a diagram showing an array example used for reviewing a processing speed according to the embodiment.

As shown in FIG. 26, any number of 0 to 7 may be assigned to each of eight records as item values. Here, the item values corresponding to the records, respectively, are different from each other. In this case, according to this embodiment, the processing in FIG. 10 is repeatedly performed on four pairs of partial intermediate blocks (for example, see reference numerals 2602-1 and 2602-2 in FIG. 26) including a pair of partial intermediate blocks relating to value lists (see reference numerals 2601-0 and 2601-1) for the record numbers "0" and "1" and a pair of partial intermediate blocks relating to value lists for the record numbers "2" and "3".

In this example, the item values are all different. Therefore, four item value comparisons are performed including comparisons between "2" and "6", "4" and "0", "3" and "7", and "5" and "1". In general, if an element is "n (where n is desirably a power of 2)", "n/2$^1$" comparisons are performed in the first processing.

Next, two partial intermediate blocks are merged to two partial middle blocks (for example, see the reference numerals 2602-1, 2602-2, 2603-1 and 2603-2 in FIG. 26). Here, three item value comparisons are performed on the partial intermediate blocks 2602-0 and 2602-1. That is, "2" and "0", "2" and "4", and "6 and 4" are compared. Three item value comparisons are similarly performed on the rest of information blocks. That is, "3" and "1", "3" and "5", and "7" and "5" are compared. In general, if an element is "n (where n is desirably a power of 2)", a maximum of "(n/2$^2$)*(2$^2$−1)" comparisons are performed.

Furthermore, a final information block is created from two partial intermediate blocks (for example, see the reference numerals 2603-1 and 2603-2 and a reference numeral 2604 in FIG. 26). Here, seven item value comparisons are performed. That is, "0" and "1", "2" and "1", "2" and "3", "4" and "3", "4" and "5", "6" and "5", and "6" and "7" are compared. In general, if an element is "n (where n is desirably a power of 2)", a maximum of "(n/2$^3$)*(2$^3$−1)" comparisons are performed.

In view of the above-described number of comparisons, the following number of comparisons are performed in merging partial intermediate blocks:
First: (n/2$^1$) comparisons
Second: (n/2$^2$)*(2$^2$−1) comparisons
Third : (n/2$^3$)*(2$^3$−1) comparisons
:
log$_2$(n)th: (n/2$^{log2(n)}$)*(2$^{log2(n)}$−1) comparisons Number of comparisons required for information block creation may be a total sum of comparisons in the merging processing. Therefore, the total number of comparisons can be obtained from a following equation 1:
[EQ1]

$$\sum_{j=1}^{\log_2(n)} n*(2^j - 1)/2^j \approx n*(\log_2(n) - 1) \quad (1)$$

Apparently, when item values do not overlap with each other (when item values are all different), a maximum of about "n*log$_2$(n)−1" comparisons are performed.

On the other hand, "m" item values of "n" item values are different, a following number of comparisons are performed in merging partial intermediate blocks:
First: (n/2$^1$) comparisons
Second: (n/2$^2$)*Max((m/n)*2$^2$−1, 1) comparisons
Third: (n/2$^3$)*Max((m/n)*2$^3$−1, 1) comparisons
:
log$_2$(n)th: (n/2$^{log2(n)}$)*Max((m/n)*2$^{log2(n)}$−1, 1) comparisions Here, when "m" is significantly smaller than "n" (for example, m=an order of 1 to 4),
First: (n/2$^1$) comparisons
Second: (n/2$^2$) comparisons
Third: (n/2$^3$) comparisons
:
log$_2$(n)th: (n/2$^{log2(n)}$) comparisons.

Therefore, the total number of comparisons can be considered as approximately "n".

On the other hand, when "n" is larger than "m",
First: (n/2$^1$) comparisons
Second: (n/2$^2$)*((m/n)*2$^2$−1) comparisons
Third: (n/2$^3$)*((m/n)*2$^3$−1) comparisons
:
log$_2$(n)th: (n/2$^{log2(n)}$)*((m/n)*2$^{log2(n)}$−1) comparisons.

Therefore, the total number of comparisons is obtained from a following equation 2.

[EQ2]

$$(n/2^1) + \sum_{j=2}^{\log_2(n)} m - \sum_{j=2}^{\log_2(n)} n/2^j \approx m*(\log_2(n) - 1) \qquad (2)$$

In this way, when m item values of n item values are different, the comparison processing is performed in accordance with the magnitude of "m" as follows: when "m" is significantly small: about "n" comparisons when "m" is larger: about "m*$\log_2$(n)−1" comparisons Therefore, when the degree of item value overlapping is especially large, an order of substantially "n" information blocks is created.

According to this embodiment, a new partial intermediate block is created from a pair of partial intermediate blocks. Then, by comparing item values in the new partial intermediate block, an item value array in the partial intermediate block is created. By increasing the size of the partial intermediate block gradually, one partial intermediate block is obtained finally. The final partial intermediate block is an information block. Therefore, processing on the pairs can be performed in parallel by multiple processors.

The invention is not limited to the above-described embodiments. Various changes are possible within the scope of the present invention described in Claims. Apparently, the changes are included in the scope of the present invention.

The processing on a pair of partial intermediate blocks according to the embodiment may be performed by a single processor. Alternatively, processing on pairs may be assigned to processors in a system having parallel processors. Thus, fast processing can be achieved.

The selection of a pair of partial intermediate blocks is not limited to the one described in the embodiment. Any adjacent two partial intermediate blocks may be paired as desired.

Furthermore, according to the embodiment, a predetermined program is read into the general computer system 10. By executing the program, processing for joining multiple pieces of table format data and processing relating to the joined table format data are performed. However, the invention is not limited thereto. A board computer specially for database processing may be connected to a general computer system such as a personal computer such that the board computer can perform the processing. Therefore, units herein are not only physical measures. However, functions of each unit may be performed by software. Furthermore, functions of one unit may be performed by two or more physical units. Alternatively, functions of two or more units may be performed by one physical unit.

According to the invention, a data compiling method can be provided which achieves short processing time and which may not extremely reduce processing efficiency in any data distributions.

Furthermore, according to the invention, a compiling method is provided which can dramatically improve performance in a massive parallel system especially.

INDUSTRIAL APPLICABILITY

The invention can be used for a system for managing a large amount of data, such as a database and a data warehouse. More specifically, the invention can be used for large scale scientific technology computing, fundamental business management such as order management and stock transaction, and clerical management.

The invention claimed is:

1. A data compiling method implemented by a computer for converting table format data expressed as an array of records stored in the computer system, each including an item and an item value included therein into an information block form having a value list including item values and a position designating array including position designating numbers for designating item values in the value list in accordance with record numbers, the method comprising the steps of:
    creating, in the table format data, a partial intermediate block including an item value array including item values corresponding to record numbers, an order designating array for designating positions of item values in the item value array, and a position designating array for designating elements in the order designating array, the partial intermediate block initially corresponding to a single record;
    selecting adjacent partial intermediate blocks and creating a pair of a first partial intermediate block and a second partial intermediate block;
    merging item value arrays of the pair to create a new item value array;
    determining elements of the order designating array so as to specify item values in a predetermined order and with no redundancy in a merged new item value array by comparing item values belonging to the first partial intermediate block and item values belonging to the second partial intermediate block of the pair while eliminating duplication of the item values;
    determining elements of the position designating array so as to specify the item values before merging when the elements of the order designating array are determined; and
    repeatedly selecting and pairing adjacent partial intermediate blocks and creating a new partial intermediate block including a merged item value array, and an order designating array and position designating array whose elements are determined so as to create one partial intermediate block finally,
    wherein the finally created partial intermediate block is said information block and wherein said order designating array and the item value array form said value list.

2. A data compiling method according to claim 1, wherein the step of determining elements of the order designating array comprises the steps of:
    creating a new order designating array; and
    comparing item values in a first partial intermediate block and item values in a second partial intermediate block, determining the higher one, and locating values of the order designating array in the first partial intermediate block or second partial intermediate block designated by the item values sequentially from the higher ones of the new order designating array.

3. A data compiling method according to claim 1, further comprising, after creating one partial intermediate block finally, sequentially locating item values specified by elements positioned higher in the order designating array so as to create a new item value array in which the item values are located with no redundancy in a predetermined order, said new item value array forming said value list.

4. A computer-readable storage medium storing program instructions defining a data compiling method for converting table format data represented as an array of records each including an item and an item value included therein into an information block form having a value list including item values and a position designating array including position designating numbers for designating item values in the value list in accordance with record numbers, wherein the program instructions causes a computer to perform the steps of:

creating, in the table format data, a partial intermediate block including an item value array including item values corresponding to record numbers, an order designating array for designating positions of item values in the item value array, and a position designating array for designating elements in the order designating array, the partial intermediate block corresponding to a single record;

selecting adjacent partial intermediate blocks and creating a pair of a first partial intermediate block and a second partial intermediate block;

merging item value arrays of the pair to create a new item value array;

determining elements of the order designating array so as to specify item values in a predetermined order and with no redundancy in a merged new item value array by comparing item values belonging to the first partial intermediate block and item values belonging to the second partial intermediate block of the pair while eliminating duplication of the item values;

determining elements of the position designating array so as to specify the item values before merging when the elements of the order designating array are determined; and repeatedly selecting and pairing adjacent partial intermediate blocks and creating a new partial intermediate block including a merged item value array, and an order designating array and position designating array whose elements are determined so as to create one partial intermediate block finally, wherein the finally created partial intermediate block is said information block and wherein said order designating array and said item value array form said value list.

5. A storage medium according to claim 4, wherein the step of determining elements of the order designating array comprises the steps of:

creating a new order designating array; and comparing item values in a first partial intermediate block and item values in a second partial intermediate block, determining the higher one, and locating values of the order designating array in the first partial intermediate block or second partial intermediate block designated by the item values sequentially from the higher ones of the new order designating array.

6. A storage medium according to claim 4, wherein the program instructions cause the computer to further perform the step of, after creating one partial intermediate block finally, sequentially locating item values specified by elements positioned higher in the order designating array so as to create a new item value array in which the item values are located with no redundancy in a predetermined order, said new item value array forming said value list.

7. A program stored on a computer-readable storage medium executed by a computer to perform a data compiling method for converting table format data represented as an array of records each including an item and an item value included therein into an information block form having a value list including item values and a position designating array including position designating numbers for designating item values in the value list in accordance with record numbers, the program causes the program to perform the steps of:

creating, in the table format data, a partial intermediate block including an item value array including item values corresponding to record numbers, an order designating array for designating positions of item values in the item value array, and a position designating array for designating elements in the order designating array, the partial intermediate block corresponding to a single record;

selecting adjacent partial intermediate blocks and creating a pair of a first partial intermediate block and a second partial intermediate block;

merging item value arrays of the pair to create a new item value array;

determining elements of the order designating array so as to specify item values in a predetermined order and with no redundancy in a merged new item value array by comparing item values belonging to the first partial intermediate block and item values belonging to the second partial intermediate block of the pair while eliminating duplication of the item values;

determining elements of the position designating array so as to specify the item values before merging when the elements of the order designating array are determined; and repeatedly selecting and pairing adjacent partial intermediate blocks and creating a new partial intermediate block including a merged item value array, and an order designating array and position designating array whose elements are determined so as to create one partial intermediate block finally, wherein the finally created partial intermediate block is said information block and wherein said order designating array and said item value array form said value list.

8. A program according to claim 7, causing a computer to perform the steps of:

in the step of determining elements of the order designating array, creating a new order designating array; and comparing item values in a first partial intermediate block and item values in a second partial intermediate block, determining the higher one, and locating values of the order designating array in the first partial intermediate block or second partial intermediate block designated by the item values sequentially from the higher ones of the new order designating array.

9. A program according to claim 7, for causing the computer to further perform: after creating one partial intermediate block finally, sequentially locating item values specified by elements positioned higher in the order designating array so as to create a new item value array in which the item values are located with no redundancy in a predetermined order, said new item value array forming said value list.

10. A data compiling method according to claim 2, further comprising, after creating one partial intermediate block finally, sequentially locating item values specified by elements positioned higher in the order designating array so as to create a new item value array in which the item values are located with no redundancy in a predetermined order, said new item value array forming said value list.

11. A storage medium according to claim 5, wherein the program instructions cause the computer to further perform the step of, after creating one partial intermediate block finally, sequentially locating item values specified by elements positioned higher in the order designating array so as to create a new item value array in which the item values are located with no redundancy in a predetermined order, said new item value array forming said value list.

12. A program according to claim 8, for causing the computer to further perform: after creating one partial intermediate block finally, sequentially locating item values specified by elements positioned higher in the order designating array so as to create a new item value array in which the item values are located with no redundancy in a predetermined order, said new item value array forming said value list.

13. A data compiling method according to claim 1, wherein the step of determining elements of the position designating array comprises the steps of:
  creating a position designation redefining array for designating the new order designating array; and
  locating elements for specifying values located in the new order designating array at corresponding positions in the position designation redefining array in the first partial intermediate block or second partial intermediate block when the values of the order designating array are located, and
  wherein the method further comprises a step of converting the values of the position designating array in the position designation redefining array and obtaining a new position designating array.

14. A data compiling method according to claim 2, wherein the step of determining elements of the position designating array comprises the steps of:
  creating a position designation redefining array for designating the new order designating array; and
  locating elements for specifying values located in the new order designating array at corresponding positions in the position designation redefining array in the first partial intermediate block or second partial intermediate block when the values of the order designating array are located, and
  wherein the method further comprises a step of converting the values of the position designating array in the position designation redefining array and obtaining a new position designating array.

15. A storage medium according to claim 4, wherein the step of determining elements of the position designating array comprises the steps of:
  creating a position designation redefining array for designating the new order designating array; and
  locating elements for specifying values located in the new order designating array at corresponding positions in the position designation redefining array in the first partial intermediate block or second partial intermediate block when the values of the order designating array are located, and
  wherein the method further comprises a step of converting the values of the position designating array in the position designation redefining array and obtaining a new position designating array.

16. A storage medium according to claim 5, wherein the step of determining elements of the position designating array comprises the steps of:
  creating a position designation redefining array for designating the new order designating array; and
  locating elements for specifying values located in the new order designating array at corresponding positions in the position designation redefining array in the first partial intermediate block or second partial intermediate block when the values of the order designating array are located, and
  wherein the method further comprises a step of converting the values of the position designating array in the position designation redefining array and obtaining a new position designating array.

17. A program according to claim 7, causing a computer to perform the steps of: in the step of determining elements of the position designating array,
  creating a position designation redefining array for designating the new order designating array; and
  locating elements for specifying values located in the new order designating array at corresponding positions in the position designation redefining array in the first partial intermediate block or second partial intermediate block when the values of the order designating array are located,
  wherein the program causes the computer to further perform a step of converting the values of the position designating array in the position designation redefining array and obtaining a new position designating array.

18. A program according to claim 8, causing the computer to perform the steps of:
  in the step of determining elements of the position designating array,
  creating a position designation redefining array for designating the new order designating array; and
  locating elements for specifying values located in the new order designating array at corresponding positions in the position designation redefining array in the first partial intermediate block or second partial intermediate block when the values of the order designating array are located,
  wherein the program causes the computer to further perform a step of converting the values of the position designating array in the position designation redefining array and obtaining a new position designating array.

19. A data compiling method implemented by a computer for converting table format data expressed as an array of records stored in the computer system, each including an item and an item value included therein into an information block form having a value list including item values and a position designating array including position designating numbers for designating item values in the value list in accordance with record numbers, the method comprising the steps of:
  creating, in the table format data, a partial intermediate block including an item value array including item values corresponding to record numbers, an order designating array for designating positions of item values in the item value array, and a position designating array for designating elements in the order designating array, the partial intermediate block initially corresponding to a single record;
  selecting adjacent partial intermediate blocks and creating a pair of a first partial intermediate block and a second partial intermediate block;
  merging item value arrays of the pair to create a new item value array;
  determining elements of the order designating array so as to specify item values in a predetermined order in a merged new item value array by comparing item values belonging to the first partial intermediate block and item values belonging to the second partial intermediate block of the pair;

determining elements of the position designating array so as to specify the item values before merging when the elements of the order designating array are determined; and repeatedly selecting and pairing adjacent partial intermediate blocks and creating a new partial intermediate block including a merged item value array, and an order designating array and position designating array whose elements are determined so as to create one partial intermediate block finally, wherein the finally created partial intermediate block is said information block and wherein said order designating array and said item value array form said value list, and wherein the step of determining elements of the order designating array comprises the steps of:

creating a new order designating array; and comparing item values in a first partial intermediate block and item values in a second partial intermediate block, determining the higher one, and locating values of the order designating array in the first partial intermediate block or second partial intermediate block designated by the item values sequentially from the higher ones of the new order designating array;

wherein the step of determining elements of the position designating array comprises the steps of:

creating a position designation redefining array for designating the new order designating array; and locating elements for specifying values located in the new order designating array at corresponding positions in the position designation redefining array in the first partial intermediate block or second partial intermediate block when the values of the order designating array are located, and wherein the method further comprises a step of converting the values of the position designating array in the position designation redefining array and obtaining a new position designating array.

20. A computer-readable storage medium storing program instructions defining a data compiling method for converting table format data represented as an array of records each including an item and an item value included therein into an information block form having a value list including item values and a position designating array including position designating numbers for designating item values in the value list in accordance with record numbers, wherein the program instructions causes a computer to perform the steps of:

creating, in the table format data, a partial intermediate block including an item value array including item values corresponding to record numbers, an order designating array for designating positions of item values in the item value array, and a position designating array for designating elements in the order designating array, the partial intermediate block corresponding to a single record;

selecting adjacent partial intermediate blocks and creating a pair of a first partial intermediate block and a second partial intermediate block;

merging item value arrays of the pair to create a new item value array;

determining elements of the order designating array so as to specify item values in a predetermined order in a merged new item value array by comparing item values belonging to the first partial intermediate block and item values belonging to the second partial intermediate block of the pair;

determining elements of the position designating array so as to specify the item values before merging when the elements of the order designating array are determined; and repeatedly selecting and pairing adjacent partial intermediate blocks and creating a new partial intermediate block including a merged item value array, and an order designating array and position designating array whose elements are determined so as to create one partial intermediate block finally, wherein the finally created partial intermediate block is said information block and wherein said order designating array and said item value array form said value list, and wherein the step of determining elements of the order designating array comprises the steps of:

creating a new order designating array; and comparing item values in a first partial intermediate block and item values in a second partial intermediate block, determining the higher one, and locating values of the order designating array in the first partial intermediate block or second partial intermediate block designated by the item values sequentially from the higher ones of the new order designating array;

wherein the step of determining elements of the position designating array comprises the steps of:

creating a position designation redefining array for designating the new order designating array; and locating elements for specifying values located in the new order designating array at corresponding positions in the position designation redefining array in the first partial intermediate block or second partial intermediate block when the values of the order designating array are located, and wherein the method further comprises a step of converting the values of the position designating array in the position designation redefining array and obtaining a new position designating array.

21. A program stored on a computer-readable storage medium executed by a computer to perform a data compiling method for converting table format data represented as an array of records each including an item and an item value included therein into an information block form having a value list including item values and a position designating array including position designating numbers for designating item values in the value list in accordance with record numbers, the program causes the program to perform the steps of:

creating, in the table format data, a partial intermediate block including an item value array including item values corresponding to record numbers, an order designating array for designating positions of item values in the item value array, and a position designating array for designating elements in the order designating array, the partial intermediate block corresponding to a single record;

selecting adjacent partial intermediate blocks and creating a pair of a first partial intermediate block and a second partial intermediate block;

merging item value arrays of the pair to create a new item value array;

determining elements of the order designating array so as to specify item values in a predetermined order in a merged new item value array by comparing item values belonging to the first partial intermediate block and item values belonging to the second partial intermediate block of the pair;

determining elements of the position designating array so as to specify the item values before merging when the elements of the order designating array are determined; and repeatedly selecting and pairing adjacent partial intermediate blocks and creating a new partial intermediate block including a merged item value array, and an order designating array and position designating array whose elements are determined so as to create one partial intermediate block finally, wherein the finally created partial intermediate block is said information block and wherein said order designating array and said item value array form said value list, wherein the program causes a computer to perform the steps of:

in the step of determining elements of the order designating array, creating a new order designating array; and comparing item values in a first partial intermediate block and item values in a second partial intermediate block, determining the higher one, and locating values of the order designating array in the first partial intermediate block or second partial intermediate block designated by the item values sequentially from the higher ones of the new order designating array; and in the step of determining elements of the position designating array, creating a position designation redefining array for designating the new order designating array; and locating elements for specifying values located in the new order designating array at corresponding positions in the position designation redefining array in the first partial intermediate block or second partial intermediate block when the values of the order designating array are located, wherein the program causes the computer to further perform a step of converting the values of the position designating array in the position designation redefining array and obtaining a new position designating array.

* * * * *